United States Patent
Hakimian et al.

(10) Patent No.: US 9,847,989 B2
(45) Date of Patent: *Dec. 19, 2017

(54) INDEPENDENT ADMINISTERING OF VERIFIED USER-CONTROLLED ELECTRONIC IDENTIFICATIONS UTILIZING SPECIFICALLY PROGRAMMED COMPUTER-IMPLEMENTED METHODS AND COMPUTER SYSTEMS

(71) Applicants: Rex Hakimian, New York, NY (US); Oliver Etessami, Great Neck, NY (US); Shawn Hakimian, New York, NY (US); Jason Hakimian, New York, NY (US)

(72) Inventors: Rex Hakimian, New York, NY (US); Oliver Etessami, Great Neck, NY (US); Shawn Hakimian, New York, NY (US); Jason Hakimian, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/099,246

(22) Filed: Apr. 14, 2016

(65) Prior Publication Data

US 2016/0234187 A1 Aug. 11, 2016

Related U.S. Application Data

(63) Continuation of application No. 14/524,324, filed on Oct. 27, 2014, now Pat. No. 9,319,398, which is a (Continued)

(51) Int. Cl.
*H04L 29/06* (2006.01)
*G06F 21/31* (2013.01)

(52) U.S. Cl.
CPC .............. *H04L 63/08* (2013.01); *G06F 21/31* (2013.01)

(58) Field of Classification Search
CPC ....... H04L 63/08; H04L 63/20; H04L 63/205; H04L 63/0892; G06F 21/6245; G06F 21/6272; G06F 21/31; G06Q 20/3821
(Continued)

(56) References Cited

U.S. PATENT DOCUMENTS 7,941,835 B2 * 5/2011 Wolfond ................. G06F 21/31
713/186
8,015,118 B1 * 9/2011 Robinson ................ G06F 21/32
705/75
(Continued)

*Primary Examiner* — Hosuk Song
(74) *Attorney, Agent, or Firm* — Greenberg Traurig, LLP

(57) ABSTRACT

In some embodiments, the instant invention provides for a central identification management computer system that includes at least: a computer programmed with software instructions that at least include: code to receive a user registration request from a user who desires to establish a user identification profile; code to independently verify profile information of the user; code to register the user identification profile with the central identification management computer system; code to receive an identification request; code to generate a timed unique alpha-numeric identifier where the at least one first timed unique alpha-numeric identifier is associated with the user identification profile stored in the database of the central identification management system; code to transmit the timed unique alpha-numeric identifier in response to identification request; and code to record, in a permanent identification usage log, the timed unique alpha-numeric identifier, and a timestamp related to the identification request.

1 Claim, 23 Drawing Sheets

Related U.S. Application Data continuation of application No. 14/216,067, filed on Mar. 17, 2014, now Pat. No. 8,875,235.

(60) Provisional application No. 61/791,687, filed on Mar. 15, 2013.

(58) Field of Classification Search
USPC ....... 726/1–10; 713/168–170, 182, 185–186, 713/189–192; 705/76; 715/76
See application file for complete search history.

(56) References Cited

U.S. PATENT DOCUMENTS

| | | | | |
|---|---|---|---|---|
| 8,639,629 B1 * | 1/2014 | Hoffman | ................ | G06Q 20/20 |
| | | | | 705/44 |
| 8,640,206 B2 * | 1/2014 | Betsch | .................... | G06F 21/31 |
| | | | | 713/176 |
| 8,719,366 B2 * | 5/2014 | Mathew | ................. | G06Q 30/02 |
| | | | | 709/217 |
| 8,875,235 B1 * | 10/2014 | Hakimian | ............... | H04L 63/08 |
| | | | | 726/2 |
| 9,319,398 B2 * | 4/2016 | Hakimian | ............... | H04L 63/08 |

* cited by examiner

INDEPENDENT ADMINISTERING OF VERIFIED USER-CONTROLLED ELECTRONIC IDENTIFICATIONS UTILIZING SPECIFICALLY PROGRAMMED COMPUTER-IMPLEMENTED METHODS AND COMPUTER SYSTEMS

RELATED APPLICATIONS

This application is a continuation of U.S. patent application Ser. No. 14/524,324, filed Oct. 27, 2014, entitled "INDEPENDENT ADMINISTERING OF VERIFIED USER-CONTROLLED ELECTRONIC IDENTIFICATIONS UTILIZING SPECIFICALLY PROGRAMMED COMPUTER-IMPLEMENTED METHODS AND COMPUTER SYSTEMS", which is a continuation of U.S. patent application Ser. No. 14/216,067, filed Mar. 17, 2014, entitled "INDEPENDENT ADMINISTERING OF VERIFIED USER-CONTROLLED ELECTRONIC IDENTIFICATIONS UTILIZING SPECIFICALLY PROGRAMMED COMPUTER-IMPLEMENTED METHODS AND COMPUTER SYSTEMS", which claims priority of U.S. provisional application Ser. No. 61/791,687, filed Mar. 15, 2013, entitled "COMPUTER-IMPLEMENTED METHODS AND COMPUTER SYSTEMS FOR INDEPENDENT ADMINISTERING OF USER'S IDENTIFICATION FOR TRANSACTIONS INVOLVING THE USER," all of which are incorporated herein by reference in their entirety for all purposes.

TECHNICAL FIELD

In some embodiments, the instant invention is directed to independent administering of verified user-controlled electronic identifications utilizing specifically programmed computer-implemented methods and computer systems.

BACKGROUND

Paper credentials are documents that attest to the identity or other attributes of an individual or entity called the subject of the credentials. Some common paper credentials include passports, birth certificates, driver's licenses, and employee identity cards. The credentials themselves are authenticated in a variety of ways: traditionally perhaps by a signature or a seal, special papers and inks, high quality engraving, and today by more complex mechanisms, such as holograms, that make the credentials recognizable and difficult to copy or forge. In some cases, simple possession of the credentials is sufficient to establish that the physical holder of the credentials is indeed the subject of the credentials. More commonly, the credentials contain biometric information such as the subject's description, a picture of the subject or the handwritten signature of the subject that can be used to authenticate that the holder of the credentials is indeed the subject of the credentials. When these paper credentials are presented in-person, authentication biometrics contained in those credentials can be checked to confirm that the physical holder of the credential is the subject. Typically, electronic identity credentials bind a name and perhaps other attributes to a token. In e-authentication, typically, the claimant authenticates to a system or application over a network. Therefore, a token used for e-authentication is a secret and the token must be protected. In some cases, the token may, for example, be a cryptographic key, that is protected by encrypting it under a password. Typically, authentication systems are often categorized by the number of factors that they incorporate: i) something you know (for example, a password); ii) something you have (for example, an ID badge or a cryptographic key); and iii) something you are (for example, a voice print or other biometric).

BRIEF SUMMARY OF INVENTION

In some embodiments, the instant invention provides for a computer-implemented method that at least includes the following steps: receiving, by a specifically programed identification management processing computer system, a user registration request from a user who desires to establish a user identification profile; where the user registration request for the user identification profile at least includes at least a plurality of the following types of profile information of the user: i) personal identifying information, ii) personal security information, iii) personal identification trait information, iv) financial identifying information, v) governmental identifying information, vi) personal medical information, and vii) personal non-medical information; independently verifying, by the specifically programed identification management processing computer system, at least one of the following types of the profile information of the user: i) the personal identifying information, ii) the financial identifying information, and iii) the governmental identifying information; based on the independently verifying the user request for the user identification profile, registering, by the specifically programed identification management processing computer system, the user identification profile with a central identification management system; storing, by the specifically programed identification management processing computer system, the user identification profile in a database of the central identification management system; where the specifically programed identification management processing computer system is configured to generate a first set of timed unique alpha-numeric identifiers associated with the user identification profile stored in the database of the central identification management system; receiving, by the specifically programed identification management processing computer system, at least one first identification request; where the at least one first identification request at least requests the central identification management system to confirm an identity of the user; generating, by the specifically programed identification management processing computer system, at least one first timed unique alpha-numeric identifier of a first set of timed unique alpha-numeric identifiers, where the at least one first timed unique alpha-numeric identifier is associated with the user identification profile stored in the database of the central identification management system and where the at least one first timed unique alpha-numeric identifier expires after a first predetermined time period; recording, by the specifically programed identification management processing computer system, in at least one permanent identification usage log, at least the following: i) the at least one first timed unique alpha-numeric identifier, and ii) the first timestamp related to the at least one first identification request; transmitting, by the specifically programed identification management processing computer system, the at least one first timed unique alpha-numeric identifier in response to the at least one first identification request; and receiving, by the specifically programed identification management processing computer system, at least one tracking request for historical information associated with a use of the at least one first timed unique alpha-numeric identifier; and responding, by the specifically programed identification management processing computer system, to the at least one tracking request for historical information regarding the at least one first timed unique alpha-numeric identifier based on the at least one permanent identification usage log.

In some embodiments, the method can further include at least the following steps of: receiving, by the specifically programed identification management processing computer system, at least one first information request; where the at least one first information request is related to at least one first transaction to be engaged by the user with at least one third party; where the at least one first information request at least includes: i) the at least one first timed unique alpha-numeric identifier, and ii) a second timestamp related to at least one first transaction; where the at least one first information request at least requests the central identification management system to provide at least one first piece of information of the profile information from the user identification profile based on the user's specific permission to release the at least one first piece of information to the at least one third party; where the at least one first information request has been generated in response to a receipt of the at least one first timed unique alpha-numeric identifier, at least one first visual presentation code of the at least one first timed unique alpha-numeric identifier, or both; matching, by the specifically programed identification management processing computer system, the at least one first timed unique alpha-numeric identifier received with the at least one first information request to the at least one first timed unique alpha-numeric identifier associated with the user identification profile stored in the database of the central identification management system; based on the matching, transmitting, by the specifically programed identification management processing computer system, the at least one first piece of information of the profile information from the user identification profile; recording, by the specifically programed identification management processing computer system, in at least one permanent identification usage log, at least the following: i) the at least one first timed unique alpha-numeric identifier, the at least one first piece of information related to the user identification profile, or both, ii) at least one second piece of information related to the at least first transaction, and iii) the second timestamp related to the at least one first transaction; and deactivating, by the specifically programed identification management processing computer system, the at least one first timed unique alpha-numeric identifier after the first pre-determined time period has expired.

In some embodiments, the method can further include at least the following steps of: specifically programming, by the specifically programed identification management processing computer system, at least one electronic device of the user so that the at least one electronic device of the user is configured to: i) originate identification requests, and ii) display each timed unique alpha-numeric identifier and at least one respective visual presentation code associated with such timed unique alpha-numeric identifier.

In some embodiments, the personal identifying information at least includes: i) a full name of the user, ii) at least one home address, and iii) at least one phone number. In some embodiments, the financial identifying information at least includes: i) at least one credit card information, and ii) at least one bank account information. In some embodiments, the personal security information at least includes: i) at least one password, ii) at least one numerical passcode, iii) at least one response to at least one security question, and iv) at least one swipe pattern. In some embodiments, the personal identification trait information at least includes: i) at least one fingerprint of the user, ii) an eye color, iii) an iris pattern, and iv) a height of the user.

In some embodiments, the method can further include at least the following steps of: establishing, by the specifically programed identification management processing computer system, access rules for releasing the profile information in the user identification profile based on at least one grouping of the profile information; and where the at least one first information request further at least includes an indication that the user has specifically authorized to release the profile information corresponding to the at least one grouping.

In some embodiments, the user is a business entity. In some embodiments, the at least one electronic device of the user is a portable electronic device. In some embodiments, the at least one first visual presentation code of the at least one first timed unique alpha-numeric identifier is at least one programmed QR code.

In some embodiments, the instant invention provides for a central identification management computer system that includes at least the following components: at least one programmed computer, having a non-transient computer tangible readable medium having stored thereon software instructions executable by at least one processor of the computer, where the software instructions at least include: code to receive a user registration request from a user who desires to establish a user identification profile; where the user registration request for the user identification profile at least includes at least a plurality of the following types of profile information of the user: i) personal identifying information, ii) personal security information, iii) personal identification trait information, iv) financial identifying information, v) governmental identifying information, vi) personal medical information, and vii) personal non-medical information; code to independently verify at least one of the following types of the profile information of the user: i) the personal identifying information, ii) the financial identifying information, and iii) the governmental identifying information; code to, based on the independently verifying the user request for the user identification profile, register the user identification profile with the central identification management computer system; code to store the user identification profile in a database of the central identification management computer system; where the code is configured to generate a first set of timed unique alpha-numeric identifiers associated with the user identification profile stored in the database of the central identification management computer system; code to receive at least one first identification request; where the at least one first identification request at least requests the central identification management computer system to confirm an identity of the user; code to generate at least one first timed unique alpha-numeric identifier of a first set of timed unique alpha-numeric identifiers, where the at least one first timed unique alpha-numeric identifier is associated with the user identification profile stored in the database of the central identification management system and where the at least one first timed unique alpha-numeric identifier expires after a first pre-determined time period; code to record, in at least one permanent identification usage log, at least the following: i) the at least one first timed unique alpha-numeric identifier, and ii) the first timestamp related to the at least one first identification request; code to transmit the at least one first timed unique alpha-numeric identifier in response to the at least one first identification request; and code to receive at least one tracking request for historical information associated with a use of the at least one first timed unique alpha-numeric identifier; and code to respond to the at least one tracking request for historical information regarding the at least one first timed unique alpha-numeric identifier based on the at least one permanent identification usage log.

BRIEF DESCRIPTION OF THE DRAWINGS

The present invention will be further explained with reference to the attached figures. The figures constitute a part of this specification and include illustrative embodiments of the present invention and illustrate various objects and features thereof. Specific functional details disclosed herein are not to be interpreted as limiting, but merely as a representative basis for teaching one skilled in the art to variously employ the present invention.

Figure 1A:
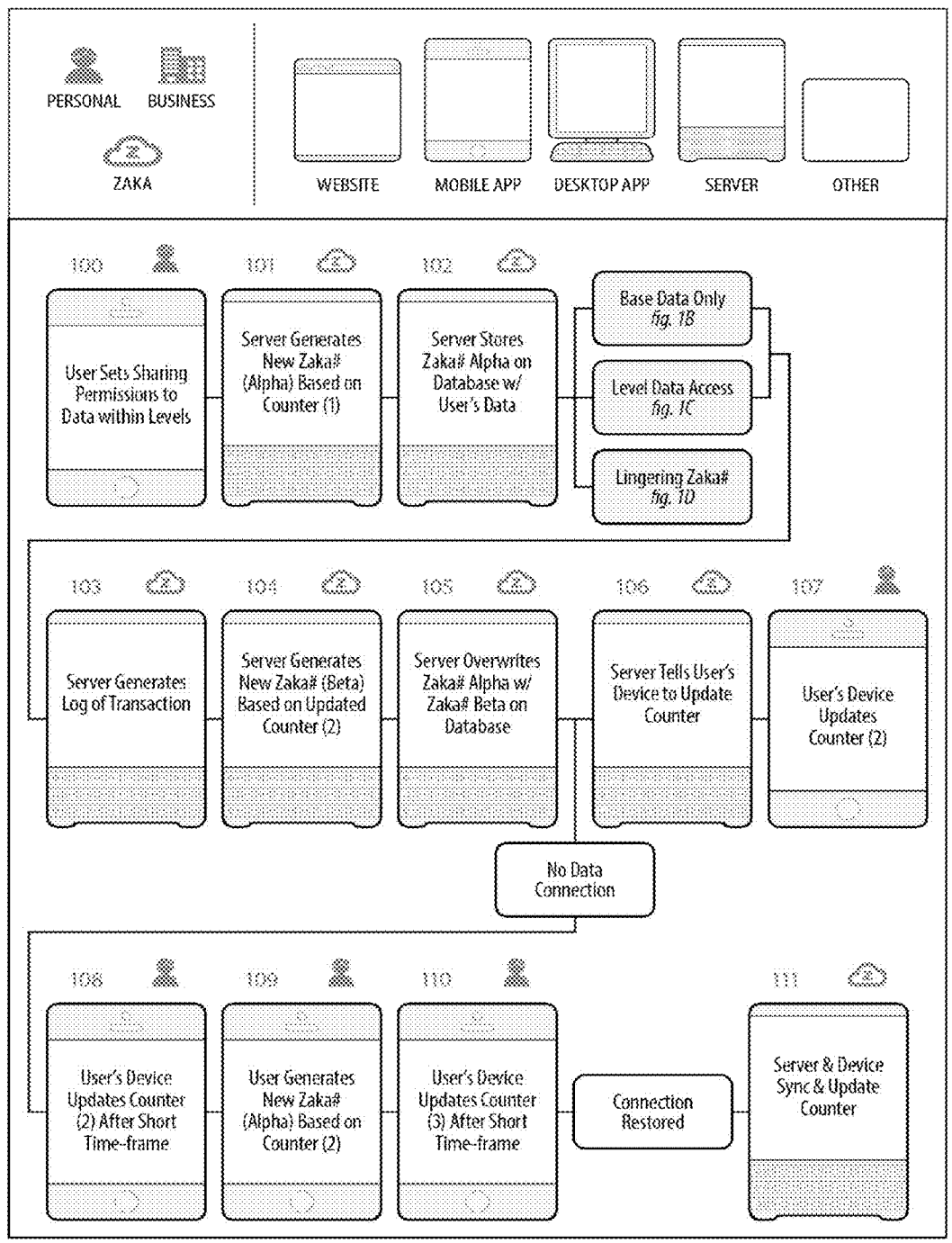
FIGS. 1A-1D illustrate certain aspects of some embodiments of the instant invention.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive. Any alterations and further modifications of the inventive feature illustrated herein, and any additional applications of the principles of the invention as illustrated herein, which can normally occur to one skilled in the relevant art and having possession of this disclosure, are to be considered within the scope of the invention.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In some embodiments, the present invention provides specifically programmed computer systems that administer claims, distribute funds, pay account payable and other similarly suitable processes in various industries. In some embodiments, the specifically programmed computer systems of the instant invention incorporate one or more rule-based engines that load, track, price, and audit claims. In some embodiments, the specifically programmed computer systems of the instant invention also utilize communication modules that electronically receive, generate, and/or transmit information about claims such as correspondence to claimants, instructions to pay, etc.

It is understood that at least one aspect/functionality of various embodiments described herein can be performed in real-time and/or dynamically. As used herein, the term "real-time" is directed to an event/action can occur instantaneously or almost instantaneously in time when another event/action has occurred. In some embodiments, the terms "instantaneous," "instantaneously," "instantly," and "in real time" refer to a condition where a time difference between a first time when a request for confirmation of the user's identifying characteristic(s) is transmitted and a second time when a response to the request is received is no more than 1 minute. In some embodiments, the time difference between the request and the response is no more than 1 second. In some embodiments, the time difference between the request and the response is between less than 1 second and 1 minute.

As used herein, the term "dynamic(ly)" is directed to an event/action that can occur without any human intervention. In some embodiments, the dynamic event/action may be in real-time, hourly, daily, weekly, monthly, etc.

In some embodiments, the instant invention allows a user, in a transaction with a vendor, to utilize an independent third party, which has no relationship to the transaction and to both, the user and the vendor, and/or has no interest in the transaction, to confirm, in real-time, the user's identifying characteristic(s) to the vendor (e.g. virtual authenticated signature).

For purposes of this disclosure, the terms "user" and "users," whether in singular or in plural form, refer to individual(s) or entity(ies) that utilize the third party to confirm to a vendor that user(s) is/are who s/he or they claim to be based, at least in part, on one or more identifying characteristics provided by the user(s) to the third party.

For purposes of this disclosure, the term "Zaka" is used to describe the inventive specifically programmed computer systems/networks of an illustrative third party that independently administer verified user-controlled electronic identifications for their members/users.

For purposes of this disclosure, the terms "vendor" and "vendors", whether in singular or in plural form, refer to individual(s) or entity(ies) with whom/which the user(s) enter(s) or desire(s) to enter into one or more transactions or refer to individual(s) or entity(ies) with whom/which the user(s) enter(s) or desire(s) to obtain a right of passage, and excludes the independent third party(ies).

For purposes of this disclosure, the terms "independent third party" and "independent third parties," whether in singular or in plural form, refer to individual(s) or entity(ies) whom/which are utilized by the user(s) to confirm the user(s)' identifying characteristic(s) to the vendor(s). In some embodiments, the independent 3rd party is, but is not limited to, the Zaka system/network as described herein.

For purposes of this disclosure, the terms "identifying characteristic" and "identifying characteristics," whether in singular or in plural form, refer to the user's personal information and/or the user's identifiable trait(s). For example, the user's personal information can include, but is not limited to, social security number, credit card number, driver's license number, passport number, date of birth, place of residence, place of work, family members, memberships of associations, attendance in a school (e.g., school Identification number/code, student number, etc.), etc. For example, the user's identifiable trait can include, but is not limited to, user's signature, eye color, iris pattern, fingerprint, height, hair color, etc. In some embodiments, the user's identifying characteristic can include a combination of the user's personal information and the user's identifiable trait.

For purposes of this disclosure, the terms "transaction" and "transactions," whether in singular or in plural form, refer to interaction(s) between the user(s) and vendor(s) that result(s) in exchange(s), for monetary or non-monetary compensation, of good(s) and/or services, and/or right of passage.

Illustrative Examples of Account Registration, Validations and Uses of Signed-Up Users (Personal and Business) in Accordance with Some Embodiments of the Instant Invention In some embodiments, upon creation of an account (e.g., Zaka ID profile), a user can be asked to validate certain core profile criteria for basic level ID verification. In some embodiments, the validation criteria can include, but not limited to:

Email address: Unique code is emailed to the user which must be clicked on to validate access, Primary address: Pin number is mailed to address which much be entered upon login, Bank account/credit card: for example, utilizing a specifically programmed API or another suitable service to: (i) make small deposit(s) to account(s) and/or (ii) withdraw small amount(s) from account(s)—which must be entered upon login, Driver's License: License number is entered and validated against DMV database, Social Security Number: User uploads a copy of their social security number (manually verified), and Date of Birth: User uploads a copy of their birth certificate (manually verified).

In some embodiments, the instant invention allows/offers users tiered/levels of control and validation. For example, in some embodiments, users can set-up additional criteria or a combination of the criteria to obtain a higher-level account validation. In some embodiments, the higher-level account validation is done at the user's discretion and/or as a requirement by vendor(s).

In some embodiments, the user's profile information can be organized in groups. In some embodiments, the user's profile information can be organized in levels and groups. In some embodiments, the levels and groups can be arranged/organized in one or more of the following ways, but are not limited to: hierarchical arrangement, non-hieratical arrangement, successive arrangement, non-successive arrangement, logical relationships arrangement, non-logical relationships arrangement, and other suitable arrangements.

In some embodiments, once the user's account is setup, the user can pre-authorize vendors, who are part of the inventive identification network (e.g., members of Zaka's network), thereby authorizing a certain vendor to access to the user's information requested by such vendor prior to and/or during a visitation, and/or the user can use the user's unique Zaka ID while interacting with vendors and/or entities who are not currently members of the inventive system/network (e.g., not members of Zaka's network).

In some embodiments, vendors can sign up with the inventive systems/networks (e.g., Zaka) and pre-define criteria they would require from potential users. For example, in some embodiments, John Smith might be a physician that requires certain medical history upon visitation from a new patient. For example, the "medical history" can be outside of basic criteria/information given by a member in the user's profile, the vendor John Smith can request those additional fields as requirements for users that may wish to pre-authorize that information to John. In another example, in some embodiments, if a Zaka user wishes to engage with John, the user can "pre-authorize" that information and answer the questions requested by John prior to visitation, thereby speeding up the process before the first visit with John. In some embodiments, the information that John requires that is already part of the Zaka profile would only need to be authorized by the user, and any additional information can be pre-filled beforehand.

In some embodiments, if a vendor/entity or an individual who is not currently on the Zaka platform wishes to validate the identity of and/or gather verified information from the Zaka's user, they can use the Zaka number which is an unique identifier that corresponds to Zaka ID of the user (i.e., the verified electronic profile set-up by the user with Zaka). In some embodiments, the inventive systems/network of the present invention (e.g., Zaka's system/network) will assist its user in generating a random unique alpha-numeric number (e.g., Zaka#) and/or an uniquely identifiable visual code (e.g., RFID, QR code, etc.) generated/programmed based on, but is not limited to, one or more random alpha-numeric token (e.g., Zaka#) and/or one or more biometric characteristics. The random unique alpha-numeric number (e.g., Zaka#) and the uniquely identifiable visual code are only valid for a given time period.

In some embodiments, for example, the inventive Zaka system/network generates Zaka#/QR Code, associates with the account (e.g., Zaka ID), logs it with the corresponding timestamp and then supplies it to a desired recipient (e.g., vendor and/or individual who requested the user's verified identification). In some embodiments, the user can also specify in the user's account/profile which criteria/information to provide for the unique number being generated. In some embodiments, an individual or a vendor, who is given, for example, the Zaka# can then access the Zaka system/network and enter the user's Zaka# to obtain the information from the user's profile and/or validate that the individual is in fact the person they are claiming to be. In some embodiments, as detailed below, Zaka# can also be used by the user to confirm a signature (e.g., written under a signature line) to validate that it is the particular Zaka user who signed the document.

In some embodiments, while anyone can enter Zaka#, at any time, even after it Zaka# expires, to validate the identity of the Zaka user. For example, in some embodiments, after Zaka# expires, entering the expired Zaka# into the Zaka system/network of the present invention would result in a confirmation being generated that the expired Zaka# was in fact that a person/entity but that the expired Zaka# is not valid for a current transaction.

In some embodiments, some recipients (e.g., vendors who are members of Zaka system/network) can also scan the Zaka QR code (or other suitable visual code/picture) to request information from the Zaka user. For example, upon scanning, the request would be sent to the server and, in real time, request the user's approval to send the requested information to a vendor if the vendor is not already a pre-authorized vendor. The user would then simply look over the criteria/information requested on, for example, the user's mobile device and approve to have the requested information sent to the vendor.

In some embodiments, the instant invention also allows to utilize the visual code/picture as a methodology for a quick validation, where information is not needed to be sent. For example, in some embodiments, the quick visual validation can apply to the purchase of liquor at a convenience store. A liquor vendor can scan the user's QR code, validating they are of age and, optionally, charging the credit card on file in the same process, if one has been entered into the user's Zaka ID profile.

In some embodiments, the specifically programmed systems/networks of the present invention allow to utilize the timed number validation (e.g., Zaka#), the timed visual code/picture (e.g., Zaka's QR code), or the combination of both to verify user's identity in all areas, and, if required, quickly provide access to the user's profile information (e.g., information stored in user's Zaka ID). In some embodiments, the specifically programmed systems/networks of the present invention can allow for public access to the timed number (e.g., Zaka#), the timed visual code/picture (e.g., Zaka's QR code), or the combination of both in the timestamp record. Consequently, the instant invention allows to identify/track potentially fraudulent scenarios since even if an imposter is able to obtain a past Zaka# of a user and decides to pass it as if the Zaka user, the imposter would be required to prove that the actual Zaka user is present at that the same moment/time that the timestamp of the "stolen" Zaka# suggests because the particular Zaka# is not reusable at all or not reusable in relation to the particular Zaka user.

To facilitate the description of some embodiments of the present invention in connection with diagram of FIGS. 1A-5, in the top portion, FIG. 1A provides visual symbols that are utilized throughout FIGS. 1A-5 to demonstrates various aspects of some embodiments of the present invention.

Figure 1B:
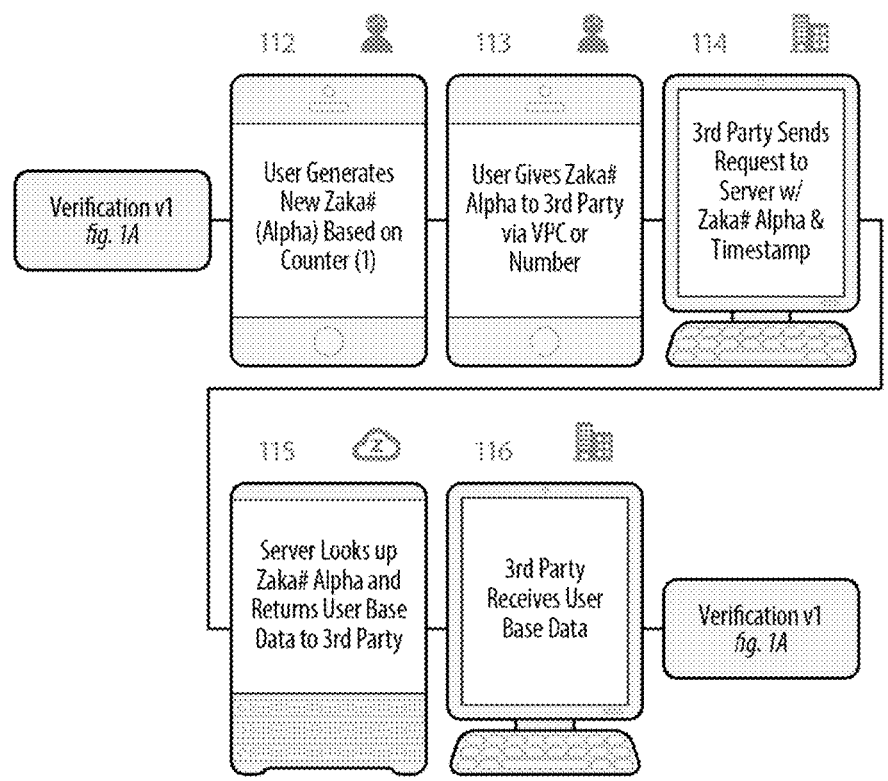
Figure 1C:
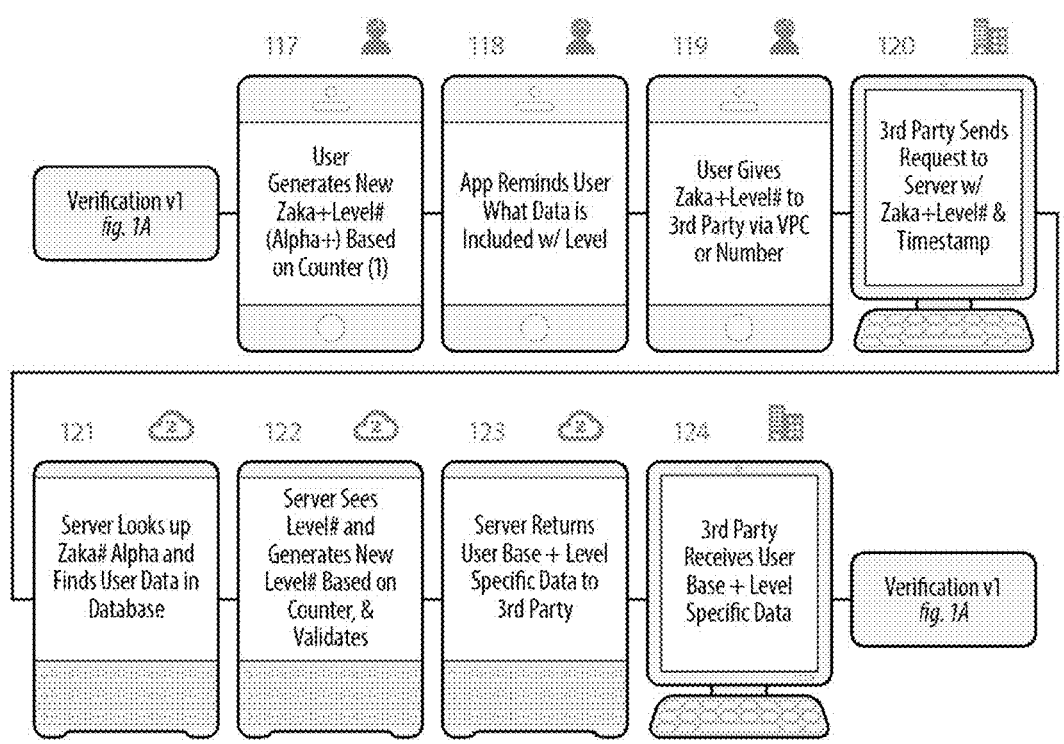
Figure 1D:
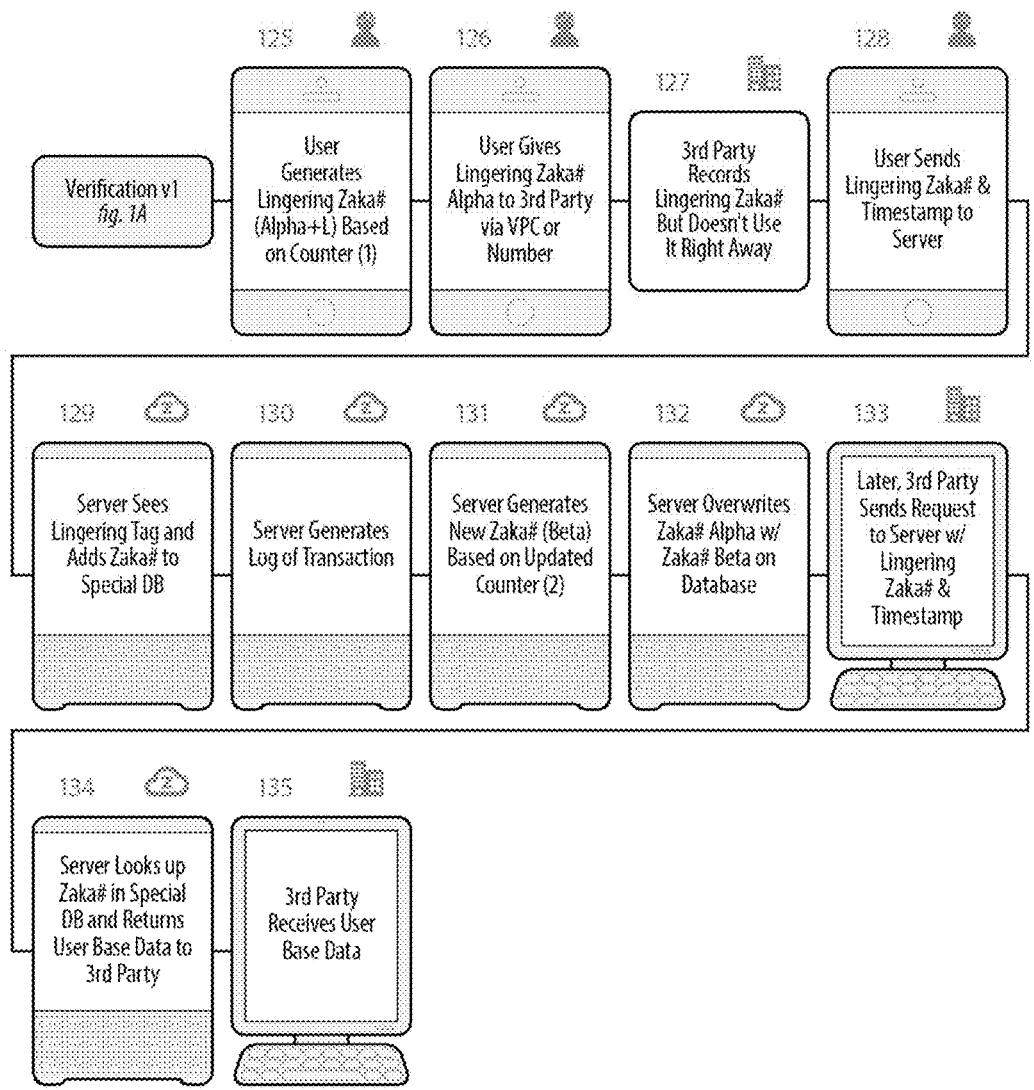

FIG. 1A illustrates an exemplary methodology of some embodiments of the present invention that is utilized to verify identity and create a timed unique number (e.g., Zaka#) for a user who has already registered with an exemplary specifically programmed system/network (e.g., Zaka system/network) and created the identification profile (e.g., Zaka ID). FIGS. 1B, 1C and 1D further illustrate various interactions between the user, 3rd party, and Zaka's servers that generate a Zaka# and then eventually respond to a request for the user's personal information.

The exemplary methodology of FIG. 1A can be utilized when the user's personal information is grouped into numerous Data Levels (i.e., levels of information/detail about the user: medical history, credit card, education, address history, financial records, travel records, etc.) that a 3rd party can request specifically. For example, in some embodiments, as illustrated in FIG. 1A, in step (100), the user can be required to set data specific sharing controls in advance, for example, as part of a registration/profile-setup which can be done through a specifically programmed mobile application ("app") and/or a specifically programmed website. As illustrated in FIG. 1A, in step (101), before the user request a new Zaka#, the Zaka system will generate a new Zaka# for the user based on a unique algorithm and a counter, which can be is shared with the user's device.

As used herein, the terms "counter" and "token" have the same meaning and are used interchangeably to mean values that are selected from at least the following types of values: numerical-based, character-based, alpha-numerical-based, sequential, non-sequential, picture-based, sound-based, biometric-based, combinations of any of the listed types, and other similar suitable types.

As illustrated in FIG. 1A, in step (102), the new Zaka# number is stored on a database with the user's personal data (i.e., at least a portion of the user's Zaka ID profile).

As illustrated in FIG. 1A, in step (103), when the user's personal information is received by the 3rd party, then the server generates a log of that transaction, and then, in step (105), overwrites the "old" database Zaka# number with a new number Zaka# in step (104) which is created by the updated counter. As illustrated in FIG. 1A, in step (106), if the user's device has a data connection, then the Zaka server informs the user's device of the updated Zaka# and, in step (107), the user's device updates its counter to match the Zaka server's one.

As illustrated in FIG. 1A, in step (108), if the user does not have a data connection (e.g., loss of mobile service), then the device's counter is updated after a period of time and, in step (109), the user can generate a new Zaka#, as needed. As illustrated in FIG. 1A, in step (110), if the data connection is still not restored, the device's counter updates again after the time period and allow a new Zaka# number to be generated. As illustrated in FIG. 1A, in step (111), when the data connection is restored, then the Zaka server and the user's device (E.g., smartphone) synchronize their counter numbers.

In some embodiments, as illustrated in FIG. 1B, if the 3rd party asks the user for the user's basic personal information/data (i.e., the based data such as demographic data: name, address, etc.), then in step (112), the user, utilizing its mobile device, generates a standard Zaka# and, in step (113), provides that Zaka# number to the 3rd party via a visual presentation code (VPC) and/or alpha-numeric number(s). As illustrated in FIG. 1B, in step (114), the 3rd party can capture the number and send the number and a timestamp to the Zaka servers. As illustrated in FIG. 1B, in step (115), the Zaka server can search its database(s) and find the pre-generated match and return the corresponding user's basic information/data to the 3rd party. As illustrated in FIG. 1B, in step (116), the user's basic data then is transmitted to the 3rd party.

In some embodiments, as illustrated in FIG. 1C, if the 3rd party requests the user to provide a specific, level-categorized data (i.e., personal data that is from one or more specialized levels/groups—medical, education, financial, etc.), then, in step (117), the user's device can generate a standard Zaka# using any suitable alpha-numerical number generators and also include/generate a Level# number appendix with the Zaka#. As illustrated in FIG. 1C, in step (118), for security, the user can be reminded what personal information/data is included with the level data access so they can choose to abort. As illustrated in FIG. 1C, in step (119), the Zaka user then provides the combined Zaka number to the 3rd party via a VPC(s) and/or the alpha-numeric number(s). As illustrated in FIG. 1C, in step (120), the 3rd party can capture the number and send the number and a timestamp to the Zaka server(s). As illustrated in FIG. 1C, in step (121), the Zaka server can search its database(s) and find the pre-generated match, in step (122), as well as the level appendix number (Level#), which the server verifies. As illustrated in FIG. 1C, in step (123), the server then returns the corresponding user's basic and specific level information/data to the 3rd party. As illustrated in FIG. 1C, in step (124), the user's data is then received by the 3rd party.

In some embodiments, as illustrated in FIG. 1D, in some embodiments, Zaka numbers are short-lived. In some embodiments, a 3rd party may need to hold on to a Zaka# number before the 3rd party can make the data request to the Zaka servers. In such scenarios, the 3rd party can specifically request the user to provide a lingering Zaka# ("Lingering Zaka#"). As illustrated in FIG. 1D, in step (125), the user's device can use one or more suitable alpha-numeric generating algorithms and a counter to generate the user's Lingering Zaka#, which would have a tag identifying it as such. As illustrated in FIG. 1D, in step (126), the user then provides the user's Lingering Zaka# number to the 3rd party via a VPC(s) and/or alpha-numeric number(s) and, in step (127), the 3rd party records the user's Lingering Zaka# for future use. As illustrated in FIG. 1D, in step (128), the user's device will also send the number to the server. As illustrated in FIG. 1D, in step (129), the server will recognize the tag, move the Zaka# to a special database and, in step (130), generate a log on the action. As illustrated in FIG. 1D, in step (132), the server will then overwrite the database Zaka# with a new number that has been created in step (131) by the updated counter.

As illustrated in FIG. 1D, in step (133), once the 3rd party is ready to use the number, the 3rd party will capture it and send the number and a timestamp to the Zaka servers. As illustrated in FIG. 1D, in step (134), the server will recognize the tag again and search the special database and return, for example, the corresponding user's base (only) information data. As illustrated in FIG. 1D, in step (135), the 3rd party's computer(s) will then receive the user's data.

Figure 2A:
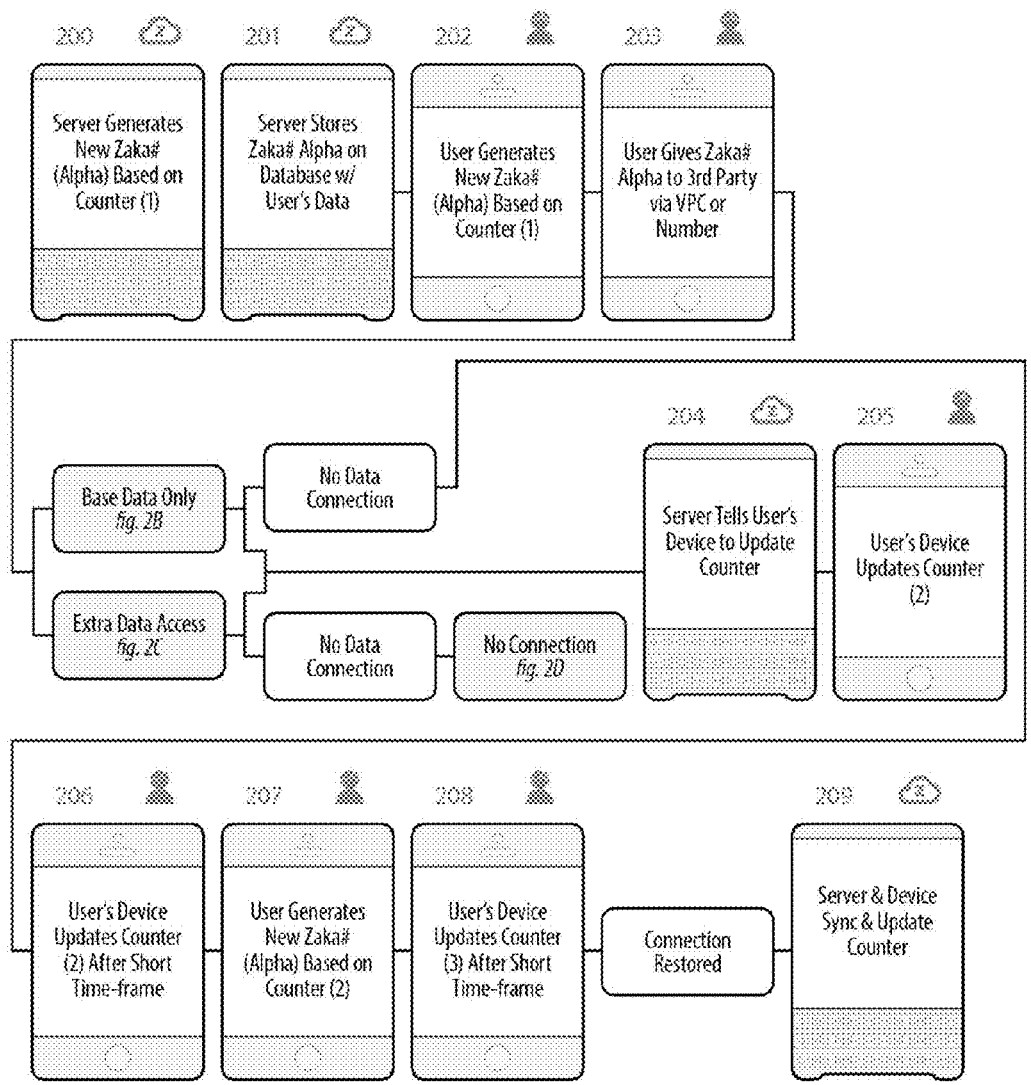
FIGS. 2A-2D illustrate certain aspects of some embodiments of the instant invention.

As illustrated in FIGS. 2A-2D, in some embodiments, the instant invention utilizes another exemplary verification methodology. As illustrated in FIG. 2A, in step (200), for the Zaka user who has established a Zaka ID profile, the Zaka system will generate a new unique Zaka# for the user based on one or more suitable alpha-numeric generators and a counter, which is shared with the user's device (e.g., smartphone or a computer). As illustrated in FIG. 2A, in step (201), this new number is stored on a database with the user's personal data. As illustrated in FIG. 2A, when a Zaka# is requested by a 3rd party, the user will use their device to, in step (202), generate a new Zaka number based on the one or more suitable alpha-numeric generators and the counter. As illustrated in FIG. 2A, in step (203), the user will provide that number to the 3rd party via VPC(s) and/or alpha-numeric number(s).

Figure 2B:
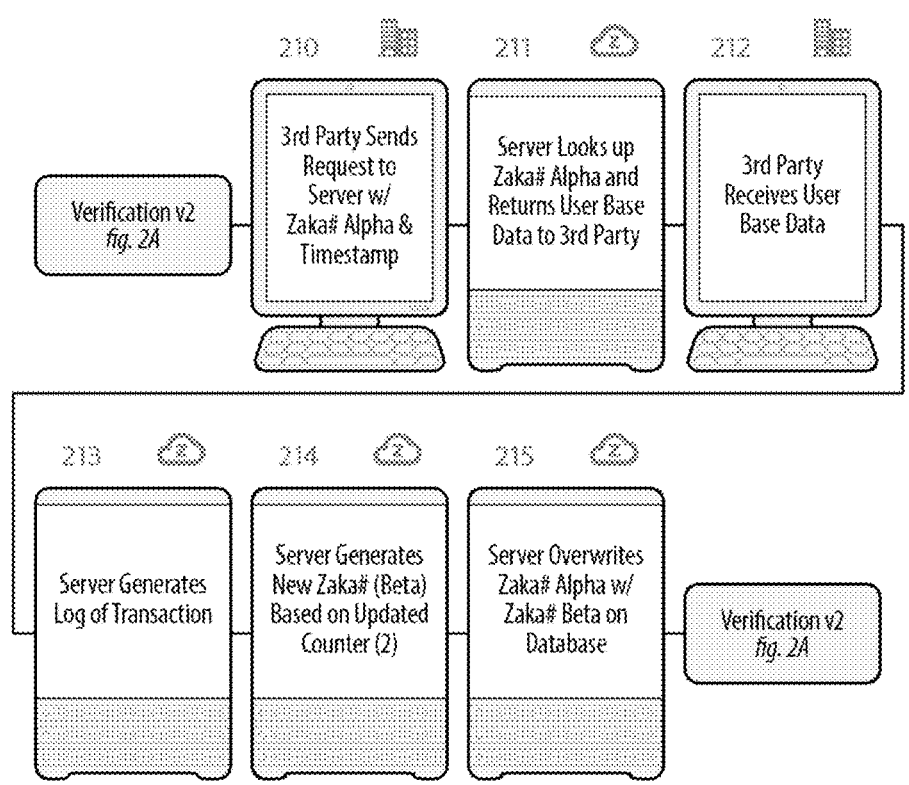
Figure 2C:
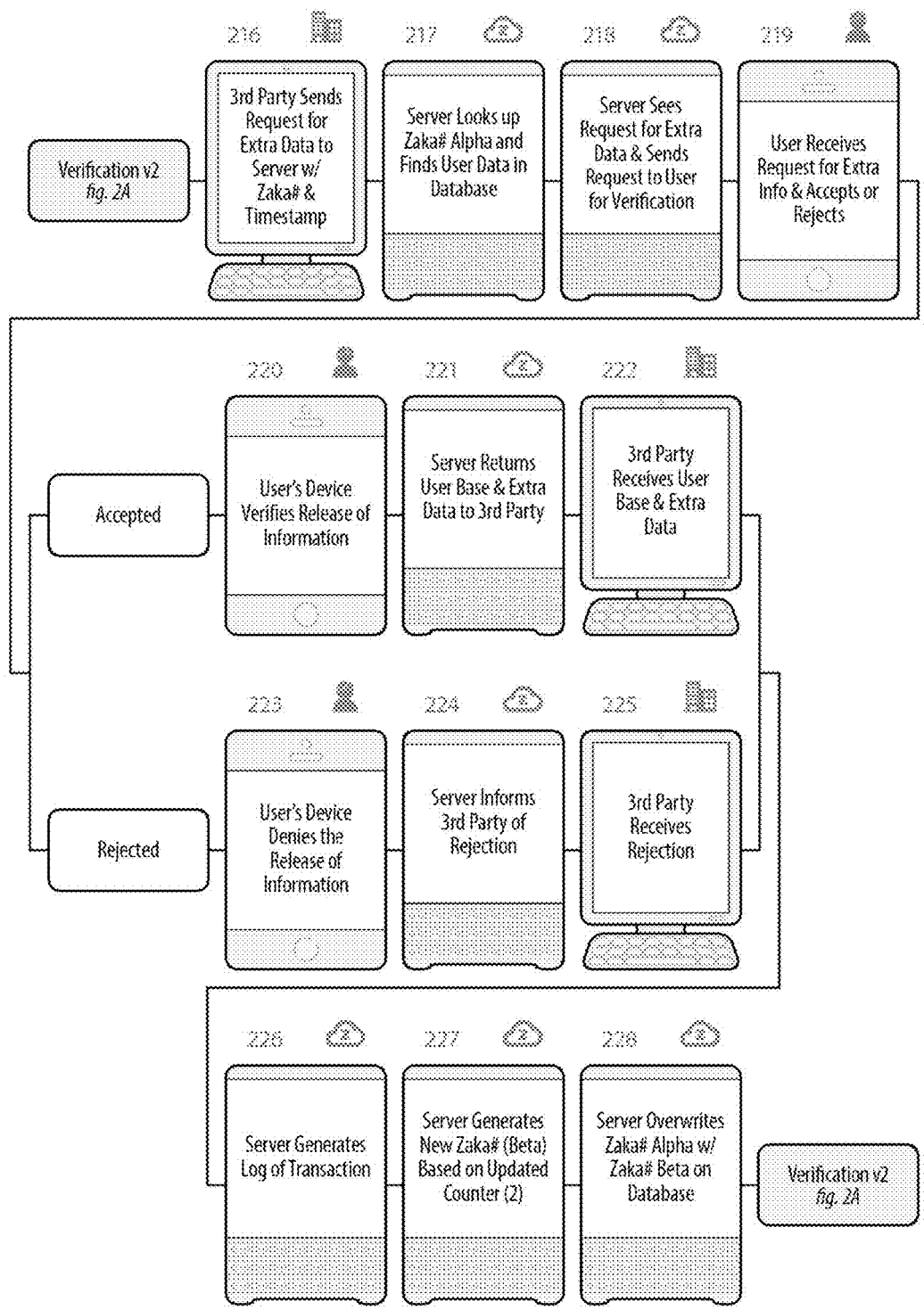

FIGS. 2B and 2C illustrate exemplary interactions between the user, a 3rd party and Zaka server(s) in response to the 3rd party's requests from two different pieces of the user's personal information. As illustrated in FIG. 2A, in step (204), if the user's device has a data connection then the server will inform the user's device of the update and, in step (205), the user's device will update its counter to match the server. As illustrated in FIG. 2A, if the user's device does not have a data connection, and only a base information/data (i.e., the user's basic personal information—Social Security No.) is requested, then, in step (206), the user device's counter will be updated after a predetermined period of time (e.g., 1 millisecond, 1 second, 1 minute, etc.) and, in step (207), the user using the user's device can generate a new Zaka#, as needed. As illustrated in FIG. 2A, in step (208) If the data connection is still not restored, the counter will update again after the time period and allow a new number to be generated. As illustrated in FIG. 2A, in step (209), once the data connection is restored then the Zaka server and the user's device will synchronize their counter numbers.

In some embodiments, as illustrated in FIG. 2B, if the 3rd party is asking the user for their base data only then, in step (210), the 3rd party will capture the user's Zaka# and send the number, timestamp, and data request to the Zaka servers. As illustrated in FIG. 2B, in step (211), the Zaka server will search its database and find the pre-generated match and return the corresponding user's base information/data to the 3rd party. As illustrated in FIG. 2B, in step (212), the user's data will then be received by a computer system of the 3rd party. In some embodiments, the additional data can include the user's credit card data and/or a confirmation that the Zaka server has charged the user's credit card/bank account an amount requested by the 3rd party. As illustrated in FIG. 2B, in step (213), once the user's information is received by the 3rd party then the server will generate a log of that transaction, and then, in step (215), the Zaka server overwrites the database Zaka# with a new number Zaka# that has been created in step (214) by the updated counter.

In some embodiments, as illustrated in FIG. 2C, if the 3rd party requests the user to provide additional information/data (i.e., information beyond the user's base data, for example, additional information may include, but not limited to: the user's medical history, the user's physicians, the user's driving license, the user's credit card, the user's financial history, the user's family members, etc.), then, in step (216), the 3rd party's computer system will capture the user's Zaka#, Zaka's VPC, or both and send such number/VPC, timestamp, and extra information/data request to the Zaka server(s). As illustrated in FIG. 2C, in step (217), the server will search its database and find the pre-generated match. As illustrated in FIG. 2C, since extra data is requested, in step (218), the Zaka server will send the request to the user's electronic device (e.g., smartphone) for verification. As illustrated in FIG. 2C, in step (219), the user's device will receive the request and provides the user, via specifically programmed UI, with options to accept, giving the 3rd party access to the specifically requested data, or reject. As illustrated in FIG. 2C, if the user accepts then, in step (220), the user's device will verify the data's release, and, in step (221), the Zaka server will return the data to the computer system of the 3rd party. As illustrated in FIG. 2C, in step (222), the user's additional data will then be received by the computer system of the 3rd party. As illustrated in FIG. 2C, if the user rejects the request then, in step (223), the user's device will deny the release of the requested information, and, in steps (224-225), the Zaka server will inform the computer system of the 3rd party of the rejection.

In both scenarios, as illustrated in FIG. 2C, in step (226), the Zaka server will generate a log of the transaction, and then, in step (228), overwrite the "old" database Zaka# with a new Zaka# number which has been created by the updated counter in step (227).

Figure 2D:
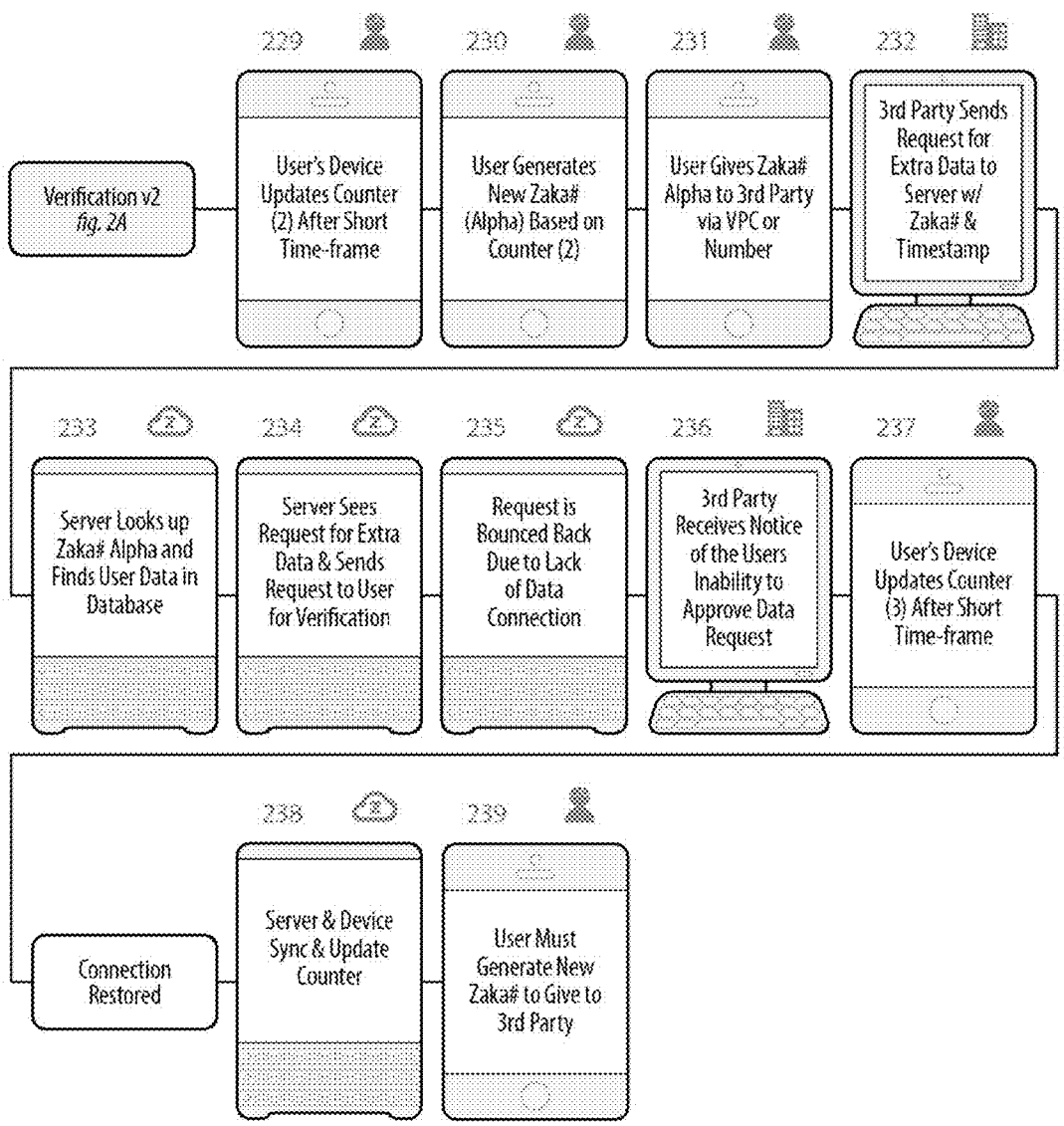

In some embodiments, as illustrated in FIG. 2D, if the additional/extra data is requested from the user and the user's electronic device does not have a data connection, in step (229), the counter of the user's device will be updated after a period of time and, in step (230), the user can generate a new Zaka#, as needed. As illustrated in FIG. 2D, if the user chooses to do so, the user, in step (231), will give that number to the 3rd party via a VPC, alpha-numeric number, or both. As illustrated in FIG. 2D, in step (232), the computer system of the 3rd party will capture the user's Zaka# and send the number, timestamp, and extra data request to the Zaka server(s). As illustrated in FIG. 2D, in step (233), the Zaka server will search its database and find the user's information. As illustrated in FIG. 2D, because, in step (234), the Zaka server identifies a request for extra data, in step (235), the Zaka server will bounce the request back to the computer system of the 3rd party due to lack of data connection on the user's device. As illustrated in FIG. 2D, in step (236), the 3rd party's computer system will receive an alert of inability to approve data request(s) by the Zaka systems.

As illustrated in FIG. 2D, in step (237), if the data connection is still not restored, the counter of the user's device will update again after the time period and allow a new number to be generated. As illustrated in FIG. 2D, in step (238), once the data connection is restored, then the Zaka server and the user's device will synchronize their counter numbers. As illustrated in FIG. 2D, in step (239), the user's device will then need to generate a new Zaka# to give to the computer system of the 3rd party to allow them receive requested data.

Personal Account Registration & Use

Figure 3A:
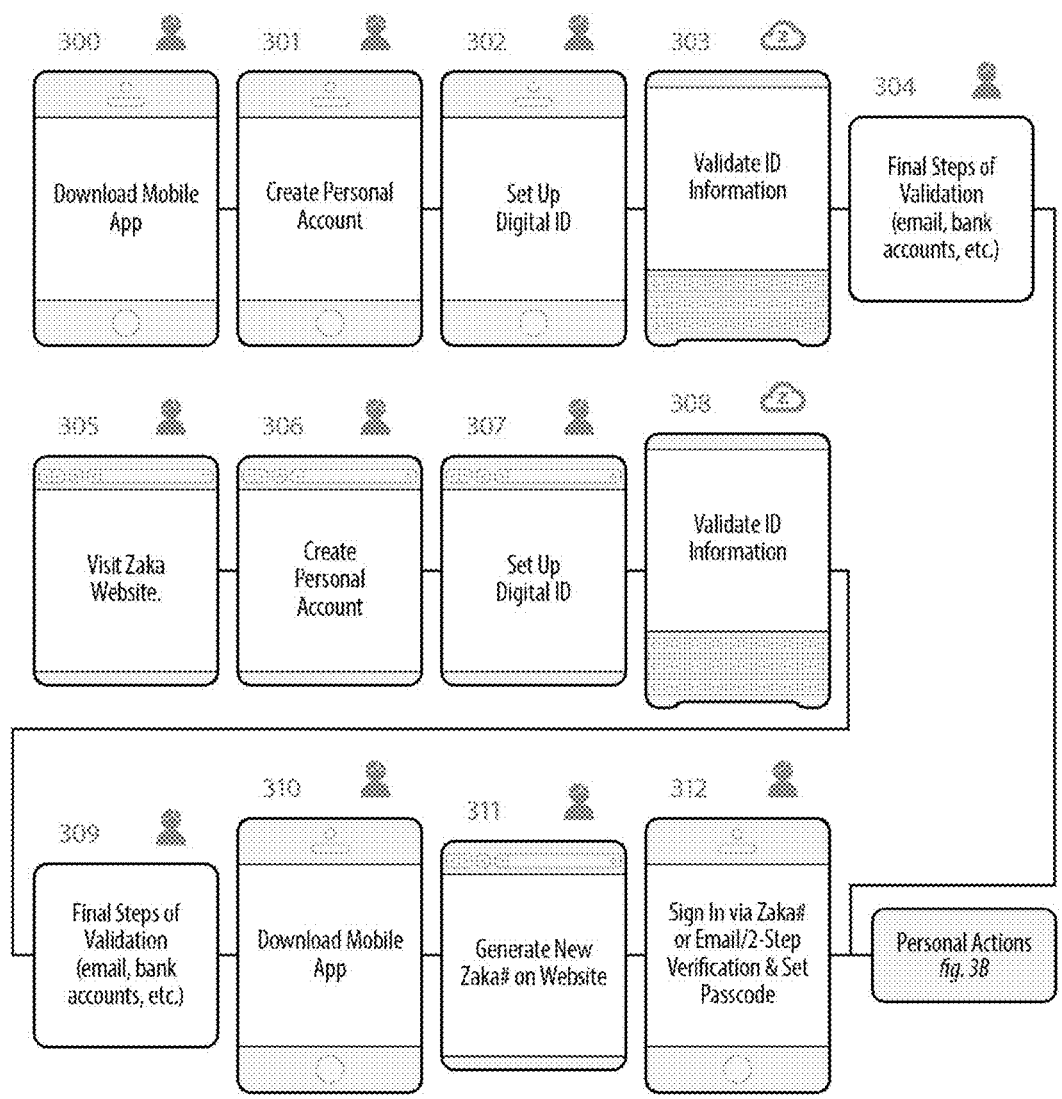
FIGS. 3A-3D illustrate certain aspects of some embodiments of the instant invention.

In some embodiments, as illustrated in FIG. 3A, a user can register for a personal account (e.g., Zaka ID profile) via a mobile app, or on a website. In some embodiments, to register and set up an account on the mobile app, as illustrated in FIG. 3A, in step (300), the user downloads the app and create an account by providing base/standard information (e.g., name, email, etc.). As illustrated in FIG. 3A, in step (302), the user is instructed to create a digital ID (e.g., Zaka ID profile), which can require the user to provide additional information (e.g., address, phone number, photo, etc.).

As illustrated in FIG. 3A, in step (303), to confirm the validity of the user and the truthfulness of the user's information/responses, the user's information/profile entries are verified through a series of validation methods (e.g., Social Security Number check, bank record comparisons, driving license check, etc.). As illustrated in FIG. 3A, in step (304), in some embodiments, at least some of the verification methods can require the user to perform additional action(s) (e.g., to receive a card in a regular mail and call a telephone number on the card to confirm the address, etc.).

As illustrated in FIG. 3A, in steps (305-310), to register and set up an account via a website, the user will go through the similar process as described above for the set-up via the mobile app. As illustrated in FIG. 3A, once their account is set up online, the user can still use the mobile app tools, which, in step (310), the user can download onto the user's device. As illustrated in FIG. 3A, in step (311), to link the user's account to the user's electronic device (e.g., smartphone), the user can be required to generate a new Zaka# on the website and, in step (312), to use such number to sign into the app on the mobile device of the user. As illustrated in FIG. 3A, for example, the user can also choose to log in via an email address & password, and/or a 2-step verification process.

Figure 3B:
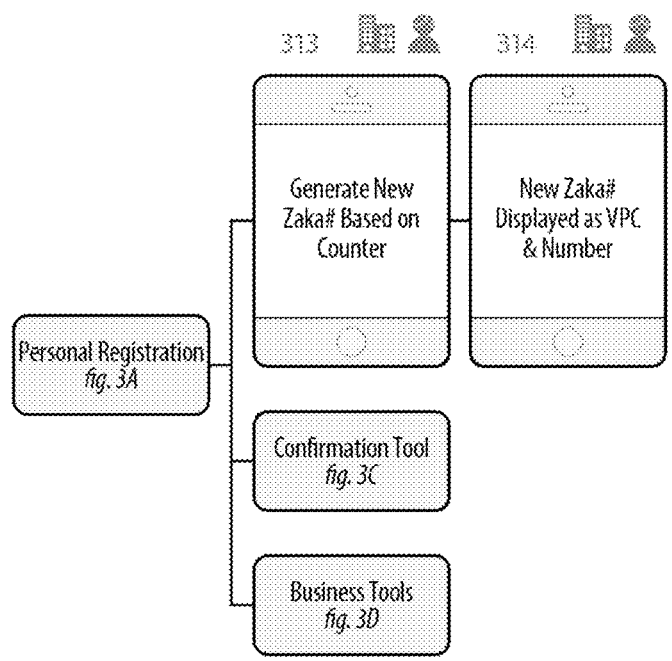

As illustrated in FIG. 3B, once the user's personal account is set up, the user can, for example, access three sections of the mobile app. As illustrated in FIG. 3B, in some embodiments, a first section can be the user's digital Zaka ID. As illustrated in FIG. 3B, in the first section of the app, the user can, in step (313), generate new Zaka#(s) based on suitable alpha-numeric algorithm(s) and a counter which is shared with the Zaka server. As illustrated in FIG. 3B, once the number is generated in step (314), the new Zaka# can be displayed as a VPC, an alpha-numeric number, or both.

Confirmation Tool

Figure 3C:
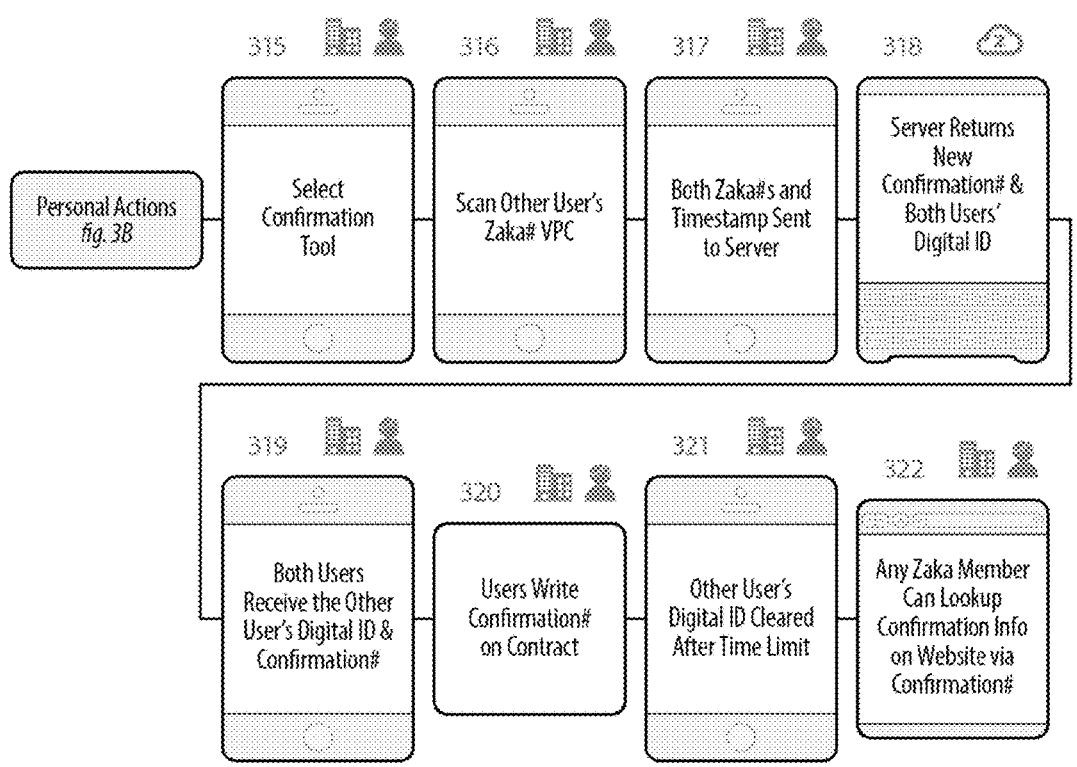

In some embodiments, as illustrated in FIG. 3C, the second section of the app can be a Confirmation Tool. In some embodiments, the confirmation tool can be used to document and validate various documents (e.g., an agreement between two Zaka users). As illustrated in FIG. 3C, in the scenario of conforming the identities of two Zaka users, who need to sign a document, a first Zaka user, in step (315), selects the confirmation tool, while the second Zaka user generates a new Zaka#. As illustrated in FIG. 3C, in step (316), the first user will scan the 2nd user's VPC representing the Zaka# and, in step (317), the electronic devices (e.g., smartphones) of both users will send the both users' Zaka#s and a timestamp to the Zaka server. As illustrated in FIG. 3C, in step (318), the Zaka server will recognize the action as a confirmation request, log the transaction and send to each user a Confirmation#, as well as the other user's base information. As illustrated in FIG. 3C, in step (319), both users will get the information of the other user to help make a manual confirmation that they are dealing with the person they intend to be dealing with. As illustrated in FIG. 3C, both will also receive the Confirmation#. As illustrated in FIG. 3C, in step (320), either of the users will be able to write down/enter the Confirmation# on the agreement. As illustrated in FIG. 3C, in step (321), after a pre-determined amount of time (e.g., less than 1 minute, less than 5 minutes, etc.), the other user's information/data will be automatically cleared/erased from each user's device. As illustrated in FIG. 3C, in step (322), any Zaka user can look up the information on the transaction by looking up the Confirmation# on the website. In some embodiments, the information on the transaction can be provided in pieces based on the requestor's status with the Zaka system/network and/or one or more characteristics of the requestor (e.g., a government agency, a Golden user, etc.)

Business Tools

Figure 3D:
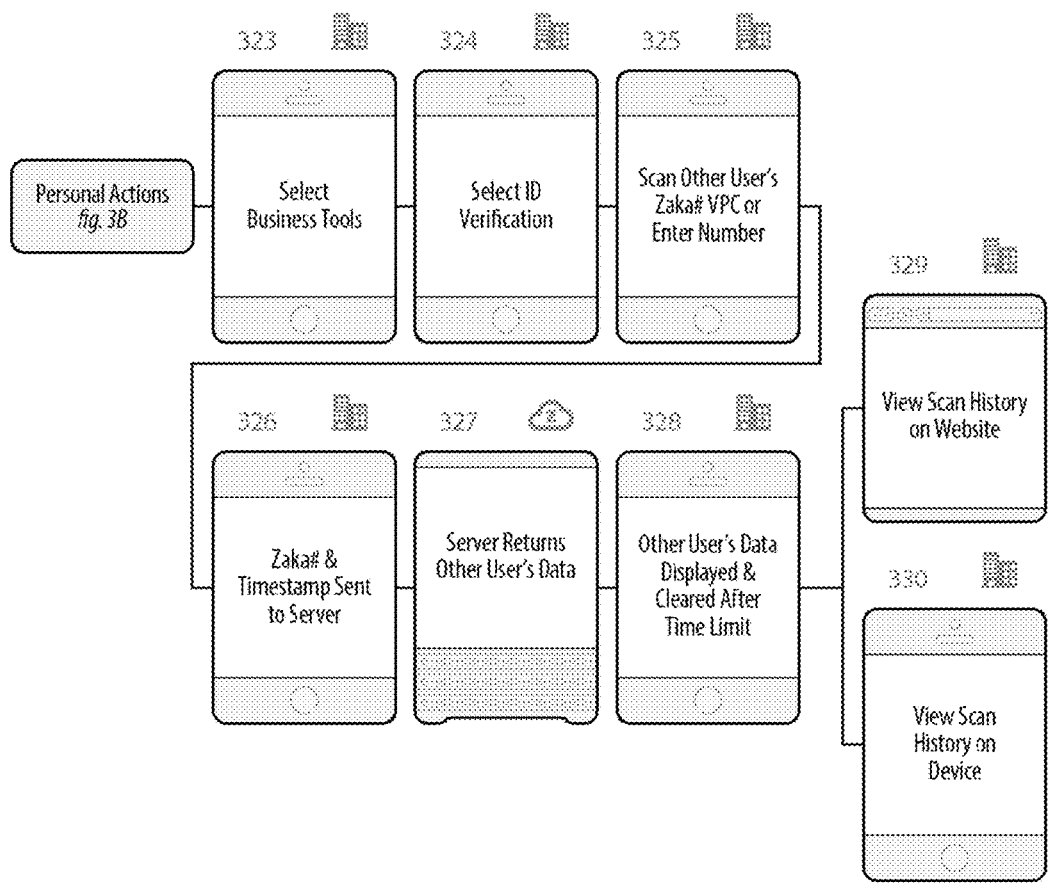

In some embodiments, as illustrated in FIG. 3D, the third section of the app can include various Business Tools. For example, the Business Tools can be used from the Zaka user's personal account (e.g., associated with the user's personal Zaka ID profile), but allow the user to perform certain actions on behalf of a business. As illustrated in FIG. 3D, in step (323), the user selects Business Tools and, in step (324), choose a particular tool, such as an ID Verification tool. As illustrated in FIG. 3D, in step (325), the ID Verification tool can allow the user to scan another Zaka user's Zaka# VPC, and/or enter the second user's alpha-numeric number. As illustrated in FIG. 3D, in step (326), the Zaka# number and a timestamp will be sent to the Zaka server for the verification, and, in step (327), the server will return, for example, the other user's basic information/data. As illustrated in FIG. 3D, in step (328), this data will be displayed on the requesting user's device and will be cleared (e.g., completely deleted) after a pre-determined amount of time (e.g., 30 seconds, 1 minute, 1 hour, etc.). As illustrated in FIG. 3D, in steps (329-330), the user can view their scan history either on the website and/or within the app.

Business Account Registration & Use

Figure 4A:
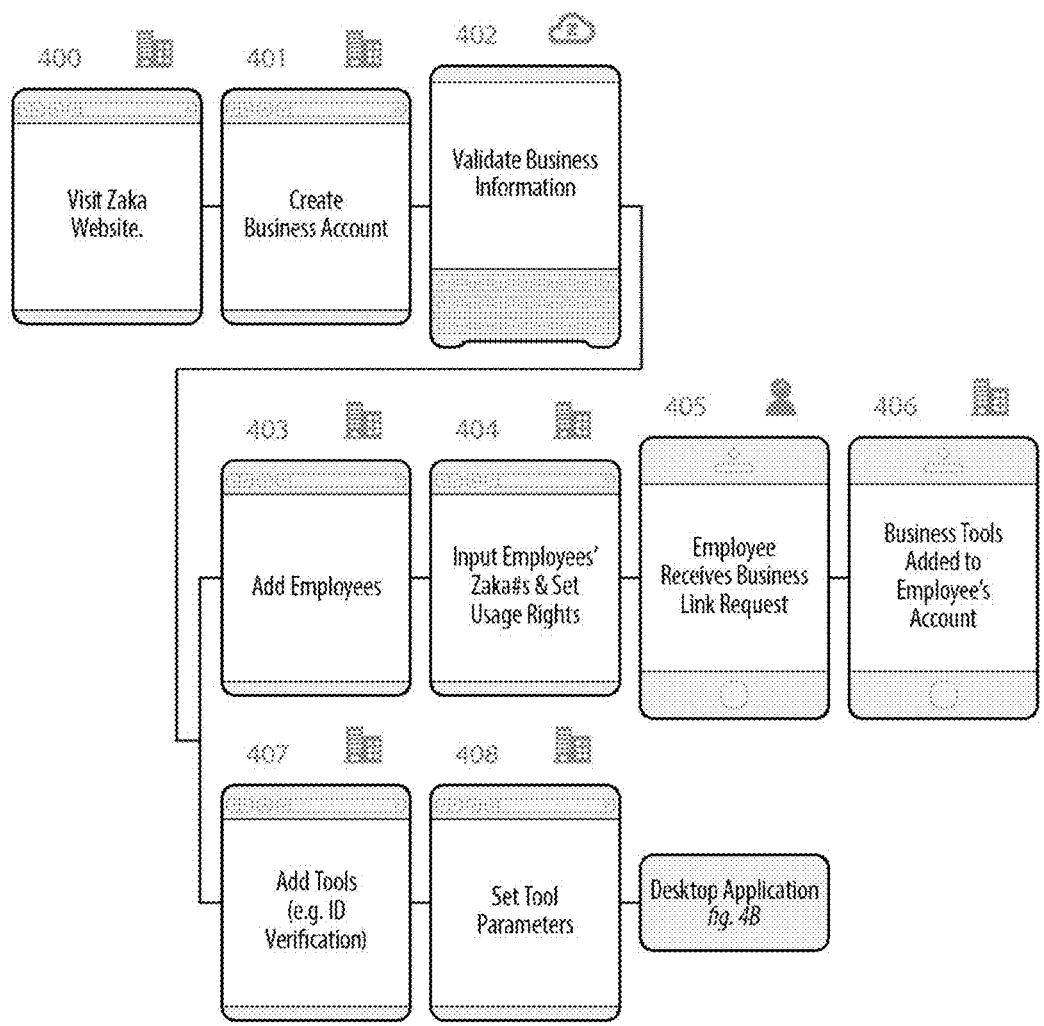
FIGS. 4A-4C illustrate certain aspects of some embodiments of the instant invention.

In some embodiments, as illustrated in FIG. 4A, in step (400), a business account can be created by visiting a website (e.g., a Zaka website). As illustrated in FIG. 4A, in step (401), similar to the personal account, the business user will need to create an account by supplying verifiable information about the business (e.g., tax ID, address, etc.). As illustrated in FIG. 4A, in step (402), to confirm the validity of the business and the truthfulness of the provided information, the business user's information/data can be verified through a series of validation methods, similar to the methodology described above regarding the personal account user.

As illustrated in FIG. 4A, once the business account is set up, the business user can performed numerous actions, such as, but not limited to, in step (403), adding employees, which will be linked to the business account; in step (407), set up one or more Business Tools.

In order to add employees, as illustrated in FIG. 4A, in step (404), the business user requests each employee's Zaka# and inputs it in the system. In some embodiments, the employee's Zaka# can be a standard Zaka# number or a lingering Zaka#, as needed. As illustrated in FIG. 4A, the business user can set the employee's usage rights at the time of the registration and/or in the future. As illustrated in FIG. 4A, in step (405), each employee will be notified, for example, via a business link request. As illustrated in FIG. 4A, once the "add" request is approved, in step (406), the business user's Business Tools will be added to each employee's personal Zaka ID account, dependent on the usage right settings.

As illustrated in FIG. 4A, in some embodiments, there can be numerous different Business Tools that, in step (407), the business user can add to a business account. In some embodiments, the business user can follow a process that is further described in connection with a ID Verification Business Tool to program/set parameters of each Business Tool for the use by authorized employees of the business user. As illustrated in FIG. 4A, in step (408), the business user sets the ID tool's parameters.

Figure 4B:
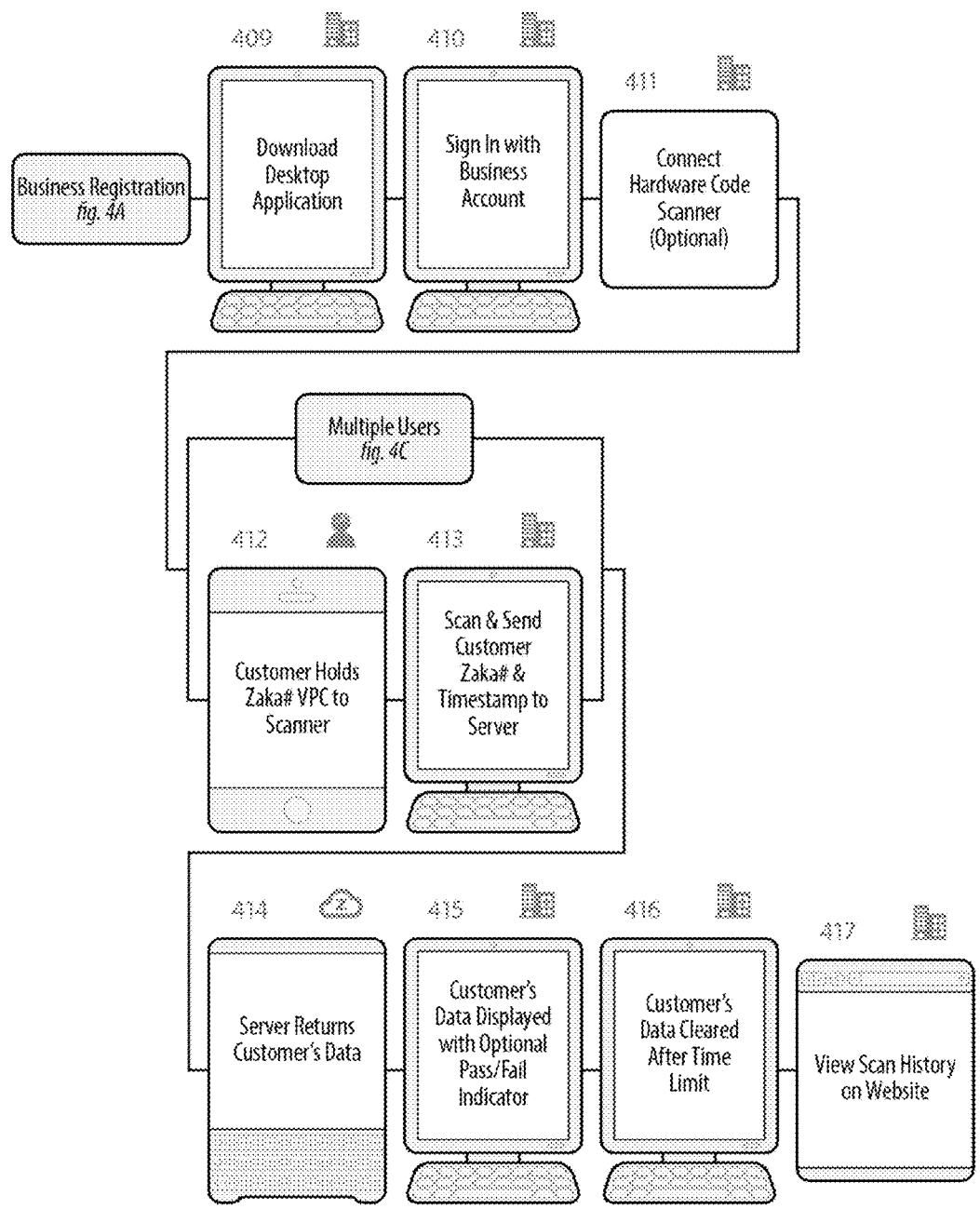

As illustrated in FIG. 4B, once a business account is created and the ID Verification tool is added to the business account, in step (409), an employee will download the desktop computer application or the app and, in step (410), sign in with the business account credentials. As illustrated in FIG. 4B, in step (411), the user can optionally set up a hardware VPC scanner.

As illustrated in FIG. C, in some embodiments, the instant invention allows to set up multiple employees on the same business tool. In some embodiments, each business user can allow its employees to use the tool straight under the business account. In such case, as illustrated in FIG. 4B, a customer, who is signed up with the Zaka system/network, will use his/her electronic device (e.g., smartphone) to generate a Zaka# number and, in step (412), provide it (e.g., by scanning) to the business user's computer system via a VPC scanner. As illustrated in FIG. 4B, in step (413), the desktop application will then send the Zaka# and a timestamp to the Zaka server. For both single and multiple user scenarios, as illustrated in FIG. 4B, in step (414), the server will return the customer's data after going through the verification process (e.g., in accordance with one or more methodologies describe in connection with FIGS. 1A-2D). As illustrated in FIG. 4B, once the data is returned to the desktop application, in step (415), the customer's data will be displayed with an optional pass/fail indicator (e.g., for use with age limitations, residential status checks, etc.). As illustrated in FIG. 4B, in step (416), after a small amount of time the customer's data will be completely cleared/erased from the desktop. As illustrated in FIG. 4B, in step (417), the business user and/or customer can view the scan history at any time via the website and/or the app.

Figure 4C:
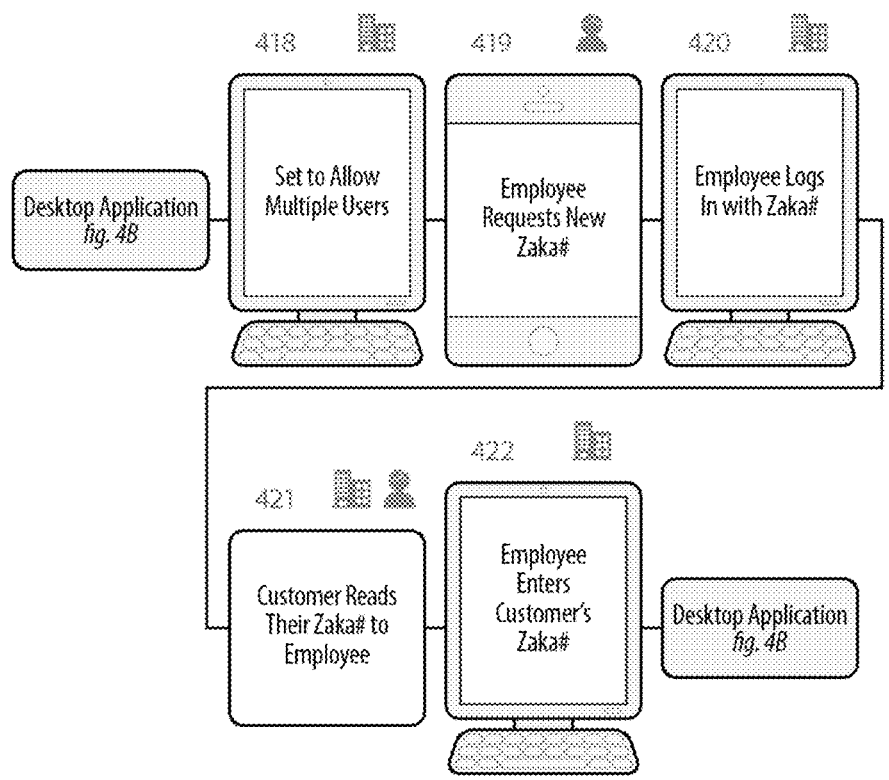

As illustrated in FIG. 4C, if the business wants multiple users to use a Business Tool, in step (418), the business user can set up multiple users. As illustrated in FIG. 4C, each user associated with the business user will then use his/her personal Zaka# by, in step (419), requesting a new number on his/her corresponding mobile device and using it to, in step (420), log into, for example, the desktop application. In this scenario, for example, a customer calls into the business and is asked for his/her Zaka# for the ID verification. As illustrated in FIG. 4C, the customer generates a new Zaka# number and, in step (431), provides (e.g., reads) the alpha-numeric number to an employee of the business user. As illustrated in FIG. 4C, in step (422), the employee then enters the customer's number into, for example, the desktop/mobile application.

API Integration

Figure 5:
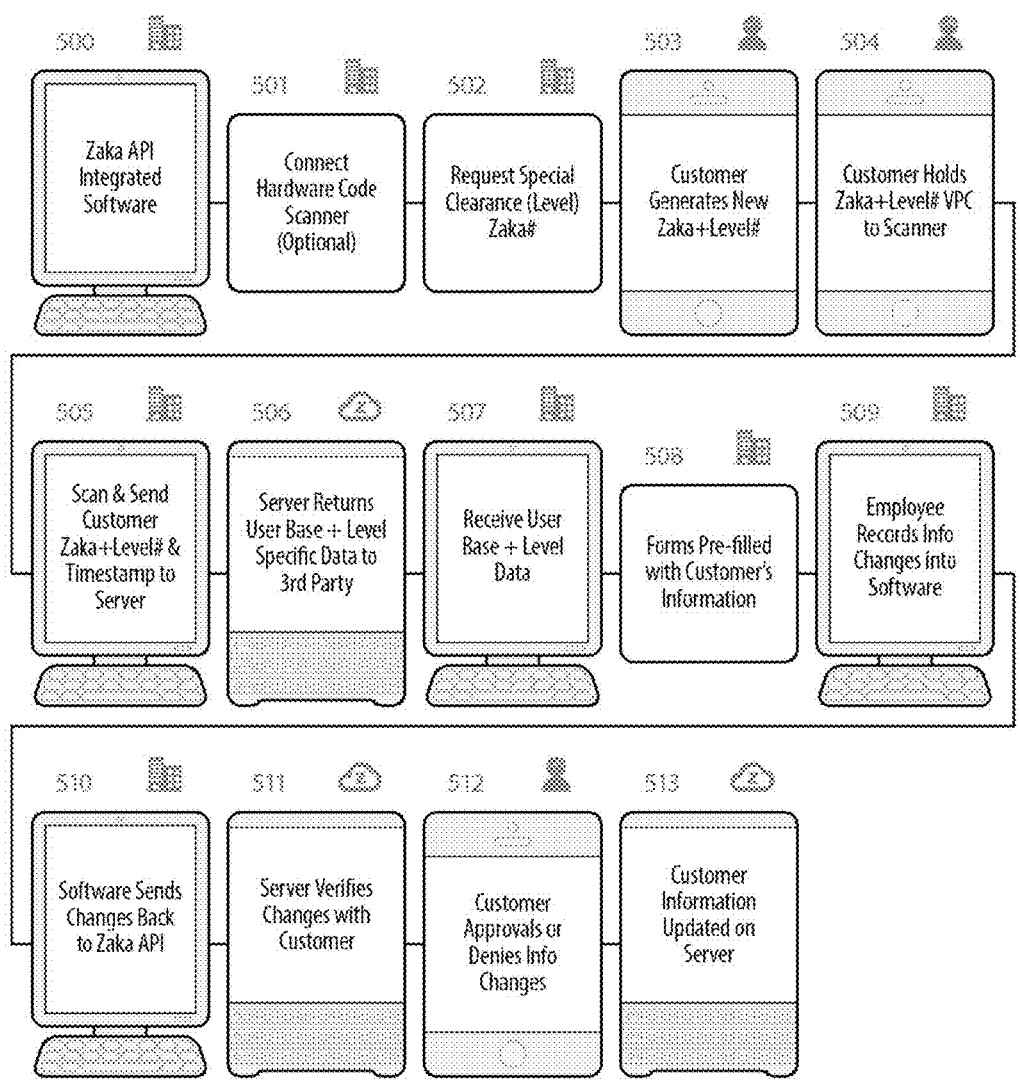
FIGS. 5-12 illustrates certain aspects of some embodiments of the instant invention.

In some embodiments, in addition to the website, the mobile app and desktop applications, as illustrated in FIG. 5, in step (500), the instant invention can provide a specific application programmed interface ("API") to be used for integration of the instant invention's identification management methodologies into 3rd party business systems (e.g., computer systems of non-members of the Zaka system/network). As illustrated in FIG. 5, in step (501), the 3rd party business systems can connect to an external hardware, such as a scanner. In this scenario, as illustrated in FIG. 5, the 3rd party business system, in step (502), can request additional and/or level-grade, information/data about a Zaka user. As illustrated in FIG. 5, in step (503), the customer of the 3rd party business system (i.e., the Zaka user) would generate a personal Zaka# number and, in step (504), for example, scan it via a VPC scanner. As illustrated in FIG. 5, in step (505), the 3rd party non-member business system would utilize the Zaka API to send the Zaka# number and a timestamp to the Zaka server and request the customer's data. As illustrated in FIG. 5, in steps (506-507), the Zaka server would verify the request and return the data to the business system. As illustrated in FIG. 5, in step (508), the business system will use the customer's information to, for example, fill-in data that would previously have been manually entered (e.g., the Zaka user's medical history, education history, employement record, etc.). In some embodiments, the computer system of the non-member 3rd party business can give the customer an option to review the data obtained from the Zaka server. As illustrated in FIG. 5, in step (509), if there are any changes, then the computer system of the non-member 3rd party would record these changes in its system, and, in step (510), would send them back to the Zaka server via the Zaka API. As illustrated in FIG. 5, in step (511), Zaka would then send a change verification message to the customer, who, in step (512), can approve or deny the changes to their Zaka account. As illustrated in FIG. 5, if the customer approves the changes then, in step (513), the customer's personal Zaka information will be updated on the Zaka server(s).

Figure 6:
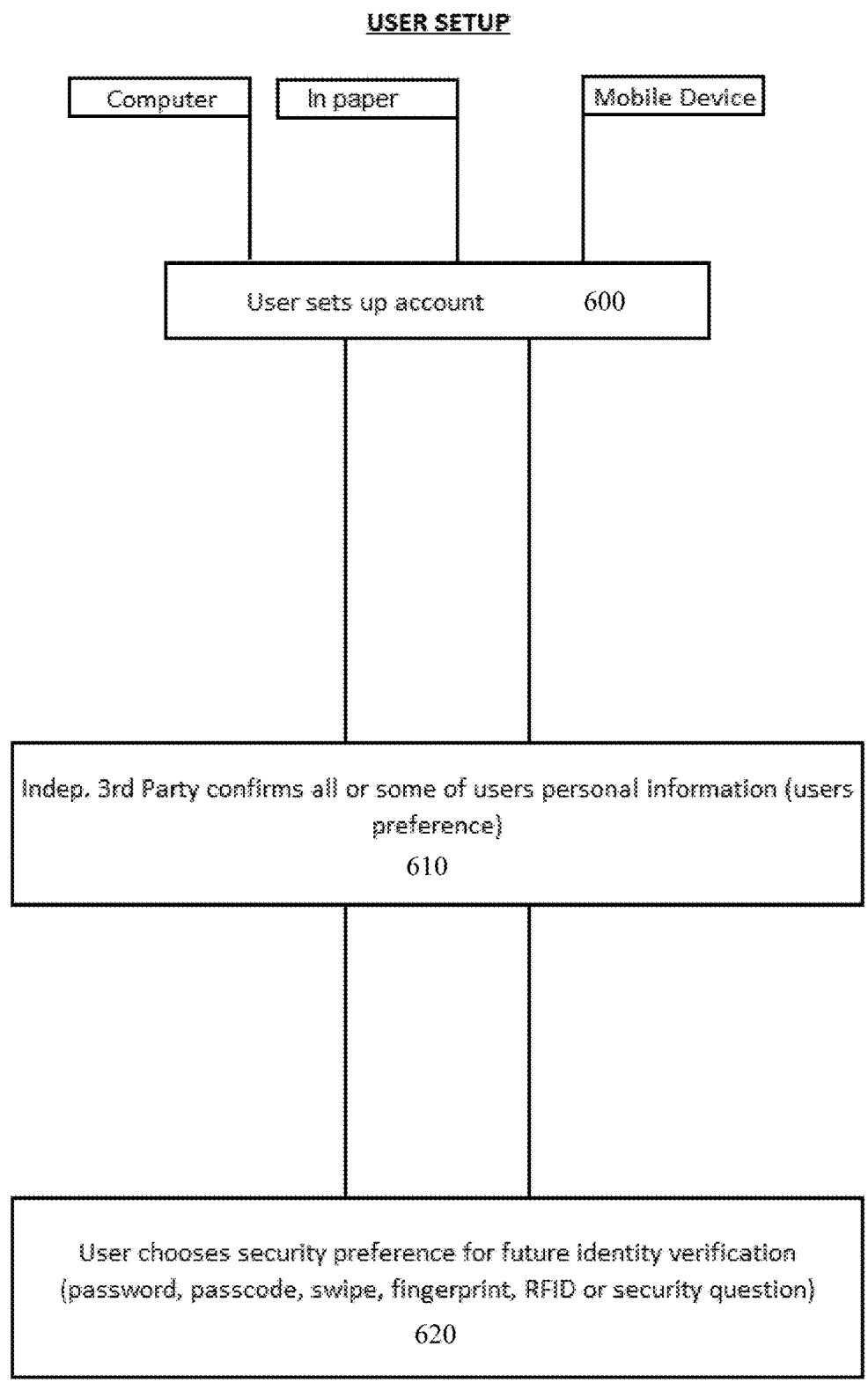
Figure 7:
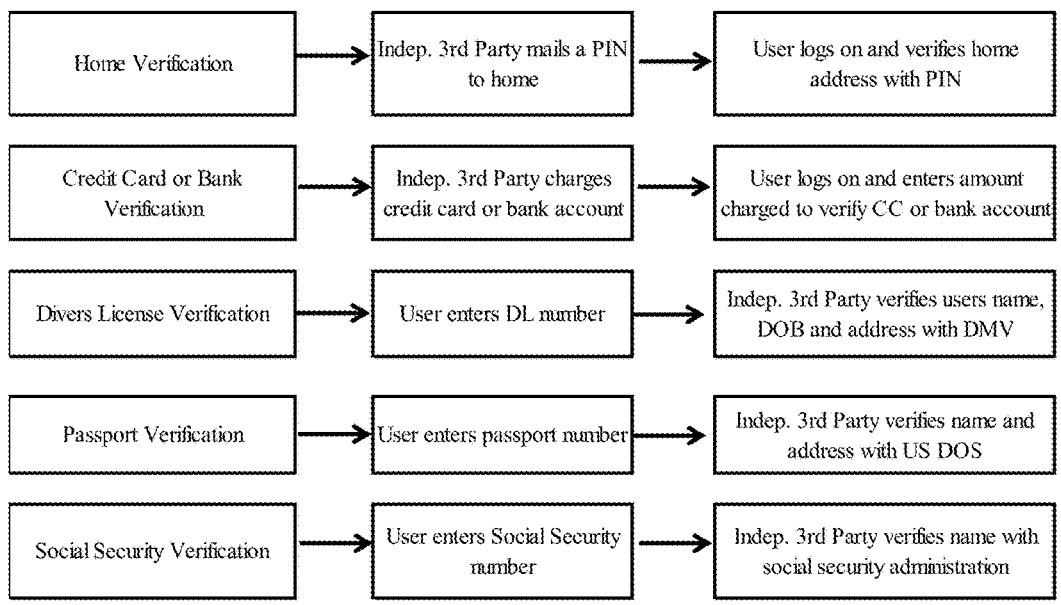

FIGS. 6 and 7 also illustrate how the user(s) can setup/register with an independent third party (the Zaka system/network) in accordance with some embodiments of the instant invention. Specifically, FIG. 6 shows that, in step 600, utilizing a computer, a mobile device, paper, or any combination thereof, the user retains an identity verification entity/service (e.g., the Zaka system/network) for user's identification purposes and provides to the identity verification entity/service (e.g., the Zaka system/network) the user's identifying characteristics such as one or more of the following, but is not limited to:

1) Personal Information:
i) Name
ii) Home Address (e.g., current address, past address(es))
iii) Phone Number
iv) Credit Card number(s)
v) Bank Account Number(s)
vi) Date of Birth;

2) Security Information and Identification Trait:
i) Password
ii) Numerical Passcode
iii) Security Questions
iv) Fingerprint
v) Swipe Pattern.

FIG. 6 shows that, in step 610, the identity verification entity/service (e.g., the Zaka system/network) then confirms, independently from the user, all or some of the identifying characteristics provided by the user so as to confirm that the user is the same individual or entity who/which the user or the entity claims to be.

For example, as shown in FIG. 7, the identity verification entity/service (e.g., the Zaka system/network) can take various approaches to confirm, in real-time or on periodic basis, the user's identifying characteristics. However, the examples of FIG. 7 are only illustrative and the identity verification entity/service (e.g., the Zaka system/network) can employ other methodologies to confirm the user's identifying characteristics and/or the user's identity.

Figure 8:
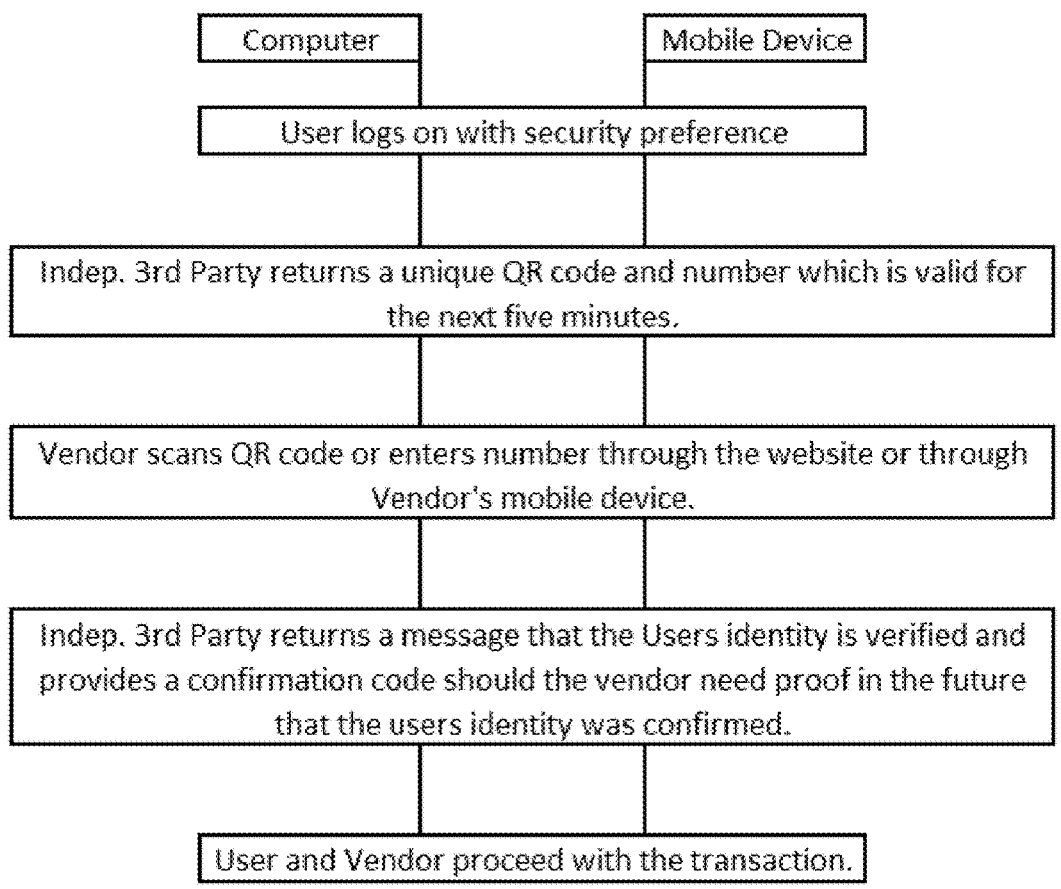

FIG. 6 shows that, in step 620, the user can choose one or more security preferences to be used between the user and the identity verification entity/service (e.g., the Zaka system/network) to confirm the user's identifying characteristics (e.g., the user's identity, the user's signature, etc.). For example, the user can designate at least one of the following security preferences and/or a combination of one or more of the following security preferences:
i) Password
ii) Numerical Passcode
iii) Security Questions
iv) Fingerprint
v) Swipe Pattern
vi) QR Code/Barcode or visual presentation equivalent
vii) RFID FIG. 8 illustrates how the user(s) can utilize the identity verification entity/service's (e.g., the Zaka system/network) real-time confirmation of the user's identifying characteristic(s) in the user's transaction(s) with the vendor(s) in accordance with some embodiments of the instant invention. As FIG. 8 illustrates, a positive response of confirming the user's identifying characteristic(s) by the independent third party can be in various form (e.g., numerical code, etc.) that allows the user and/or the vendor to continue with the transaction(s). In some embodiments, a positive response of confirming the user's identifying characteristic(s) by the identity verification entity/service (e.g., the Zaka system/network) can be in various forms (e.g., numerical code, etc.) that allow the user and/or the vendor to, automatically and/or in real time, continue with the transaction(s).

In some embodiments, the instant invention offers the user a universal way to, automatically and/or in real time, confirm that the user is who s/he claims to be in advance of the transaction(s). In some embodiments, the instant invention can be utilized at a store when the user presents a driver's license along with a credit card in order to prove that the card was not stolen. In some embodiments, the instant invention can be utilized for logging into a website when the user creates a name and password and enters his/her personal information with the confirmation. In some embodiments, with the assistance of the identity verification entity/service (e.g., the Zaka system/network), the user would verify its own identity, securely, in advance of any transaction. In some embodiments, after the verification, within the same transaction session, the identity verification entity/service (e.g., the Zaka system/network) would then always be ready, in real-time, to present the vendor with the comfort of knowing that the user that the vendor is transacting is, in fact, the right individual or the right entity.

In some embodiments, the same transaction session can be defined by a pre-determined time period (e.g., 5 minutes, 30 minutes, 1 hour, a day) whose duration depends, at least in part, on the nature of the transaction between the vendor and the user.

In some embodiments, the instant invention can be utilized for the following illustrative applications, which are only representative but not limiting of all potential application that a skilled person can recognized:

A) after setting up user's account with the identity verification entity/service (e.g., the Zaka system/network), getting verified and loading a mobile application of the identity verification entity/service (e.g., the Zaka system/network), the user could do at least one of the following, but is not limited to:
1) open an account at a bank (e.g., the bank would ask for a few forms of identification and an embodiment of the instant invention could be used as one of them);
2) go to a store to make a credit card purchase (e.g., a cashier would scan the user's barcode provided by the identity verification entity/service (e.g., the Zaka system/network) for identification to make sure the card is not stolen);
3) prove age to purchase alcohol (bar/club/liquor store);
4) use websites that could require the user to prove identity at checkout, sign up, and/or use the identity verification entity/service's (e.g., the Zaka system/network) verification process in place of the sign-in procedure altogether;
5) use for student identification;
6) use for mobile phone payments. (credit card companies would use the identity verification entity/service's (e.g., the Zaka system/network) verification process in the background to prove the user's identity);
7) use for credit card signup;
8) use to sign documents (e.g., leases);
9) interact with a governmental agency (e.g., apply for a passport);
10) leasing a car/motorcycle;
11) sign-up, pay bills, interact with phone companies, cable companies, and utility companies;
12) pick up prescription and/or restricted medicine from a pharmacy;
13) minimize sign-up paperwork (e.g., pre-filled forms) during an initial doctor's visit;
14) access to personal medical information/records;
15) submit tax forms;
16) access restricted buildings;
17) access areas that require security clearance (e.g., airport security)
18) access community parks/pools; and
19) utilize the independent 3rd party's confirmation as concert ticket/train ticket.

Figure 9:
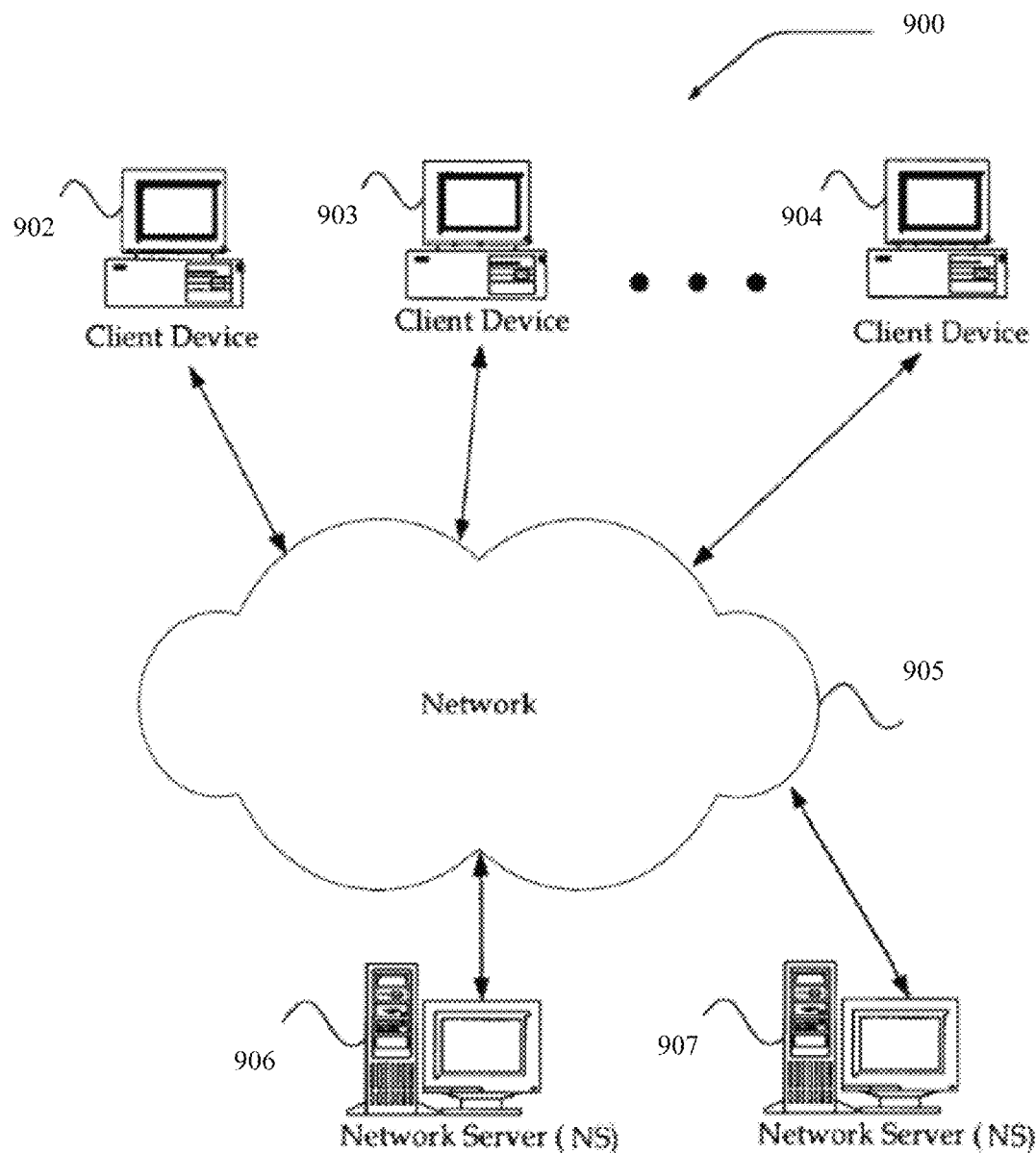

Illustrative Operating Environments of Some Embodiments of the Instant Invention FIG. 9 illustrates one embodiment of an environment in which the present invention may operate. However, not all of these components may be required to practice the invention, and variations in the arrangement and type of the components may be made without departing from the spirit or scope of the invention. In other embodiments, the instant inventive systems are based on a scalable computer and network architecture that incorporates varies strategies for assessing the data, caching, searching, and database connection pooling. An example of the scalable architecture is an architecture that is capable of operating multiple servers.

In some embodiments, members of the inventive computer system 902-904 (e.g., Zaka users, vendors) include virtually any computing device capable of receiving and sending a message over a network, such as network 905, to and from another computing device, such as servers 906 and 907 (e.g., servers of the independent 3rd part), each other, and the like. In some embodiments, the set of such devices includes devices that typically connect using a wired communications medium such as personal computers, multiprocessor systems, microprocessor-based or programmable consumer electronics, network PCs, and the like. In some embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in some embodiments, client devices 102-104 are any device that is capable of connecting using a wired or wireless communication medium such as a PDA, POCKET PC, wearable computer, and any other device that is equipped to communicate over a wired and/or wireless communication medium.

In some embodiments, each member device within member devices 902-904 may include a browser application that is configured to receive and to send web pages, and the like. In some embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like. In embodiments, the invention is programmed in either Java or .Net.

In some embodiments, member devices 902-904 may be further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In some embodiments, network 405 may be configured to couple one computing device to another computing device to enable them to communicate. In some embodiments, network 905 may be enabled to employ any form of computer readable media for communicating information from one electronic device to another. Also, in some embodiments, network 905 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In some embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), fiber Optics links, wireless links including, but not limiting to, Bluetooth™ links, GPS, satellite links, or other communications links known to those skilled in the art. Furthermore, in some embodiments, remote computers and other related electronic devices could be remotely connected to either LANs or WANs via a modem and temporary telephone link. In essence, in some embodiments, network 905 includes any communication method by which information may travel between client devices 902-904, and servers 906 and 907.

Figure 10:
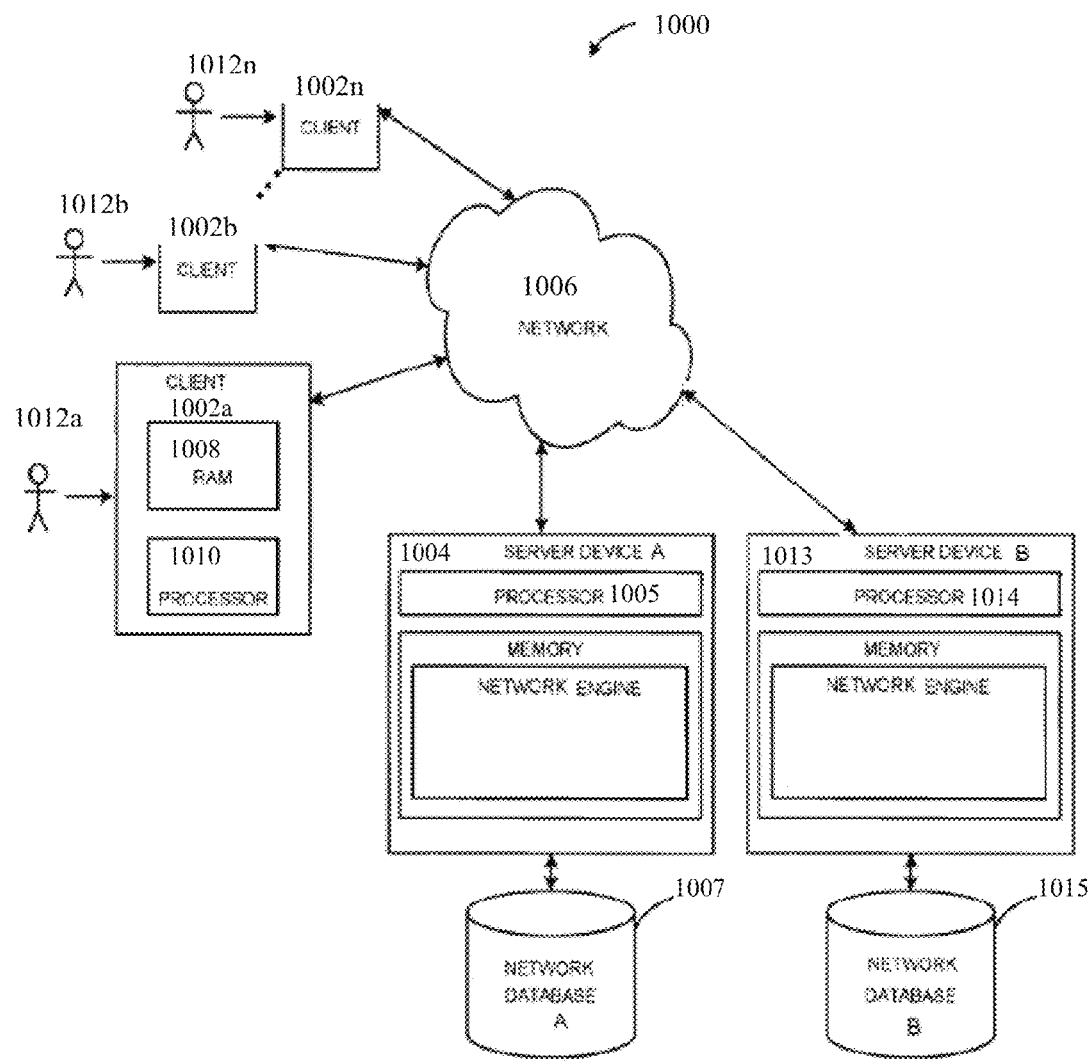

FIG. 10 shows another exemplary embodiment of the computer and network architecture that supports the inventive system automatic and in real-time verification of the user's identifying characteristics. The member devices 1002a, 1002b thru 1002n shown (e.g., users' mobile device, vendors' terminals/computer systems, the identity verification entity/service's (e.g., the Zaka system/network) computer systems each at least includes a computer-readable medium, such as a random access memory (RAM) 1008 coupled to a processor 1010 or FLASH memory. The processor 1010 may execute computer-executable program instructions stored in memory 1008. Such processors comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media may include, but are not limited to, an electronic, optical, magnetic, or other storage or transmission device capable of providing a processor, such as the processor 1010 of client 1002a, with computer-readable instructions. Other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript. Member devices 502a-n may also comprise a number of external or internal devices such as a mouse, a CD-ROM, DVD, a keyboard, a display, or other input or output devices.

Examples of client devices 1002a-n may be personal portable computers, digital assistants, personal digital assistants, cellular phones, mobile phones, smart phones, pagers, digital tablets, laptop computers, Internet appliances, and other processor-based devices. In general, a client device 1002a can be any type of processor-based platform that is connected to a network 1006 and that interacts with one or more application programs. Client devices 1002a-n may operate on any operating system capable of supporting a browser or browser-enabled application, such as Microsoft™, Windows™, or Linux. The client devices 1002a-n shown may include, for example, personal computers executing a browser application program such as Microsoft Corporation's Internet Explorer™, Apple Computer Inc.'s Safari™, Mozilla Firefox, and Opera. Through the client devices 1002a-n, users 1012a-n communicate over the network 1006 with the identity verification entity(ies)/service(s) (e.g., the Zaka system/network) and with other systems and devices coupled to the network 1006 (e.g., vendors' computer systems). As shown in FIG. 10, server devices 1004 and 1013 may be also coupled to the network 1006.

In some embodiments, the term "mobile electronic device" may refer to any portable electronic device that may or may not be enabled with location tracking functionality. For example, a mobile electronic device can include, but is not limited to, a mobile phone, Personal Digital Assistant (PDA), Blackberry™, Pager, Smartphone, or any other reasonable mobile electronic device. For ease, at times the above variations are not listed or are only partially listed, this is in no way meant to be a limitation.

In some embodiments, the terms "proximity detection," "locating," "location data," "location information," and "location tracking" as used herein may refer to any form of location tracking technology or locating method that can be used to provide a location of a mobile electronic device, such as, but not limited to, at least one of location information manually input by a user, such as, but not limited to entering the city, town, municipality, zip code, area code, cross streets, or by any other reasonable entry to determine a geographical area; Global Positions Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed, this is in no way meant to be a limitation.

In some embodiments, NFC peer-to-peer communication can be conducted when a plurality of NFC-enable device within close proximity of each other. In some embodiments, NFC tags can contain data and be read-only or rewriteable. In some embodiment, NFC tags can be custom-encoded and utilize to provide or receive, for example, Zaka#. In some embodiments, NFC tags and/or NFC-enabled device (e.g., smart phones with NFC capabilities, either embedded or peripheral) can securely store personal data such as debit and credit card information, loyalty program data, PINs and networking contacts, among other information. In another embodiments, such personal data could be stored externally in a personal space on the Central Processor where excess could be granted to a specific client.

In some embodiments, vendor data may also be communicated using any wireless means of communication, such as 4G, 3G, GSM, GPRS, WiFi, WiMax, and other remote local or remote wireless communication using information obtained via the interfacing of the user's wireless NFC enabled mobile device to the vendor's NFC device. In some embodiments, the term "wireless communications" includes communications conducted at ISO 14443 and ISO 18092 interfaces. In some embodiments, the communications between users' NFC-enabled smart devices and vendor's equipment (e.g., terminals, POS, POE, Hosts) is performed, for example, in accordance with the ISO 14443A/B standard and/or the ISO 18092 standard.

In some embodiments, NFC-enabled devices could have NFC technology embedded in them or through attached peripherals, such as, but not limited to, NFC-enabled sim card, smartphone case, etc.

In some embodiments, user's NFC-enabled smart device may include a power source, an NFC circuit configured to wirelessly communicate using an NFC communications protocol, and a processor coupled to the power source and the NFC circuit. In some embodiments, the processor of user's NFC-enabled smart device may be configured to synchronize an internal timing signal to an external timing signal, cycle power to the NFC circuit to periodically switch the NFC circuit between a peer-to-peer recognition state and a low power state based upon the synchronized internal timing signal, and initiate peer-to-peer NFC communications with another NFC device when in range thereof and upon being simultaneously switched to the peer-to-peer recognition state therewith.

In some embodiments, user's NFC-enabled smart device may include a related physical computer-readable medium and may have computer-executable instructions for causing user's NFC-enabled smart device to initiating peer-to-peer NFC communications with another NFC device when in range thereof and upon being simultaneously switched to the peer-to-peer recognition state therewith.

In some embodiments, the processor of user's NFC-enabled smart device may be configured for communicating wireless voice and data via a cellular transceiver via a cellular communications network. By way of example, the data communications may include, but not limited to, email messages, Web data, etc.

In some embodiments, user's NFC-enabled smart device may in addition (or instead) include other types of wireless communications circuits capable of transmitting voice or other data, such as a wireless LAN, WiMAX, etc., circuit. In some embodiments, the processor of user's NFC-enabled smart device may proceed directly to communicate with the trusted NFC device, and in the case of a "smart poster" NFC device (e.g., SLP/SLS), such as one configured to pass a Uniform Resource Locator (URL), the processor may automatically direct a browser application thereof to the URL without prompting for permission to proceed to the designated location.

Figure 11:
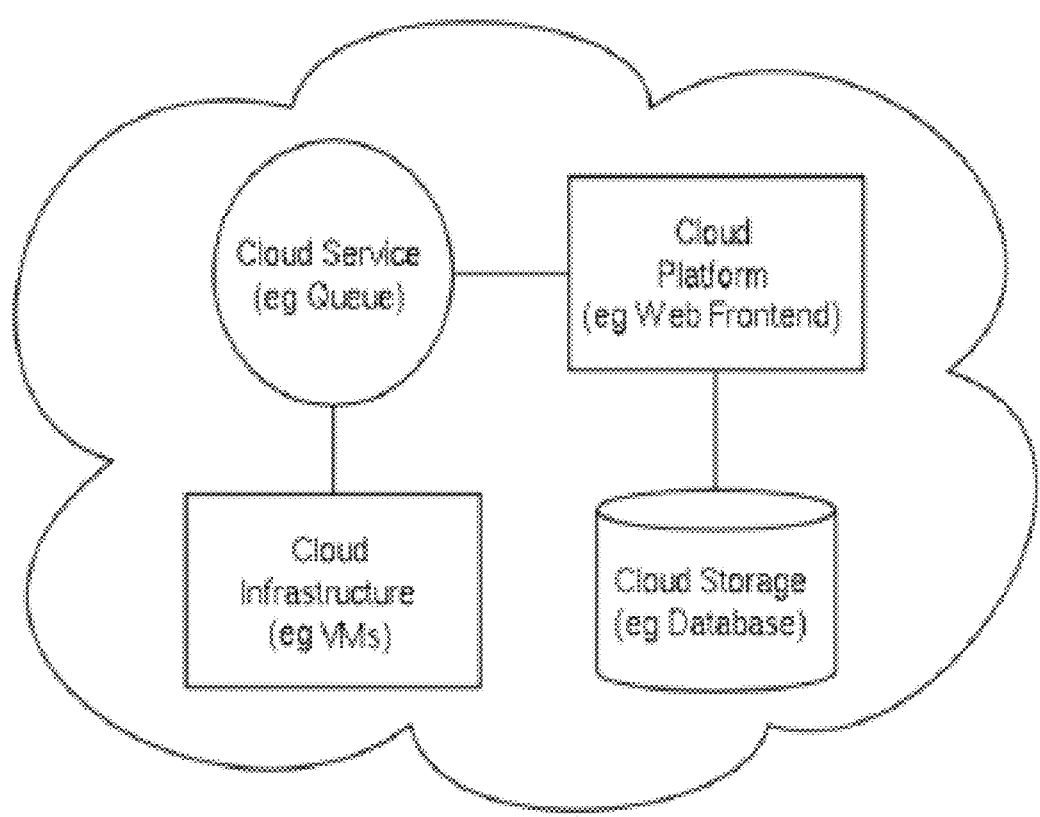
Figure 12:
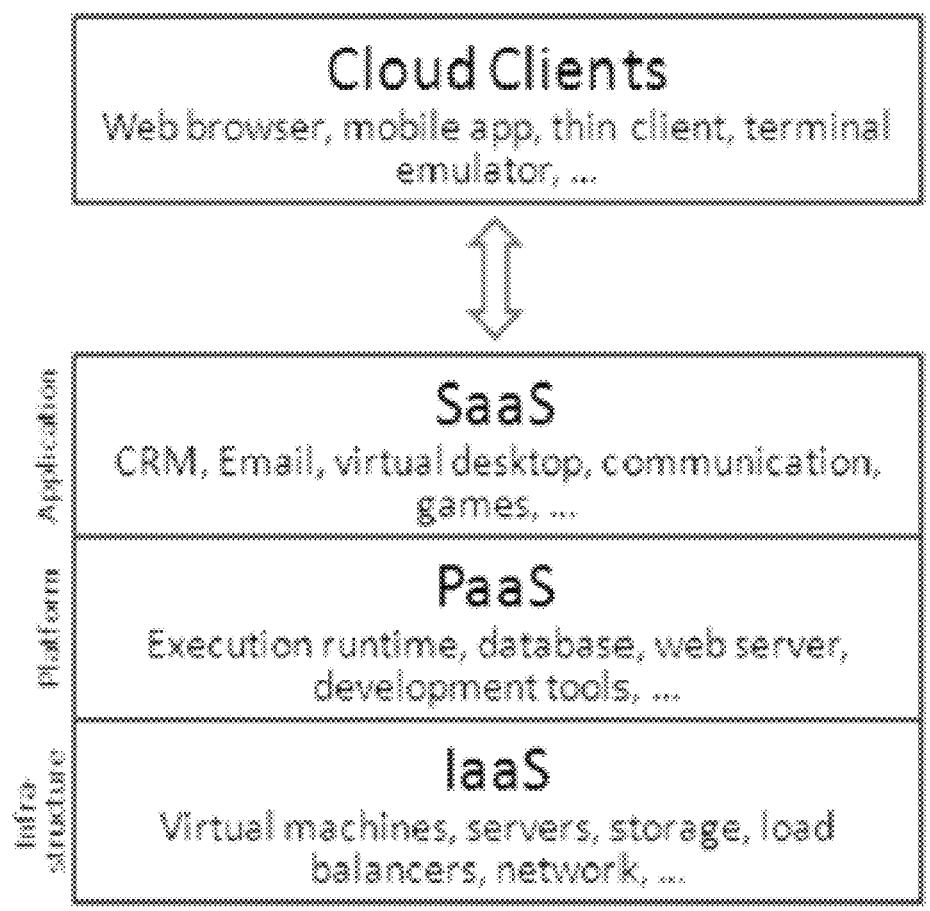

For purposes of the instant description, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). In some embodiments, the instant invention offers/manages the cloud computing/architecture as, but not limiting to: infrastructure a service (IaaS), platform as a service (PaaS), and software as a service (SaaS). FIGS. 10 and 11 illustrate schematics of exemplary implementations of the cloud computing/architecture.

In some embodiments, the instant invention provides a computer-implemented method that includes at least steps of: receiving, by a specifically programmed identification management processing computer system, a user registration request from a user who desires to establish a user identification profile; where the user registration request for the user identification profile comprises at least a plurality of the following types of profile information of the user: i) personal identifying information, ii) personal security information, iii) personal identification trait information, iv) financial identifying information, v) governmental identifying information, vi) personal medical information, and vii) personal non-medical information; independently verifying, by the specifically programed identification management processing computer system, at least one of the following types of the profile information of the user: i) the personal identifying information, ii) the financial identifying information, and iii) the governmental identifying information; based the independently verifying the user request for the user identification profile, registering, by the specifically programed identification management processing computer system, the user identification profile with a central identification management system; storing, by the specifically programed identification management processing computer system, the user identification profile in a database of the central identification management system; where the specifically programed identification management processing computer system is configured to generate a first set of timed unique alpha-numeric identifiers associated with the user identification profile stored in the database of the central identification management system; generating, by the specifically programed identification management processing computer system, at least one first timed unique alpha-numeric identifier of a first set of timed unique alpha-numeric identifiers, where the at least one first timed unique alpha-numeric identifier is associated with the user identification profile stored in the database of the central identification management system; receiving, by the specifically programed identification management processing computer system, at least one first identification request; where the at least one first identification request is related to at least one first transaction to be engaged by the user with at least one third party; where the at least one first identification request at least requests the central identification management system to: i) confirm an identity of the user and ii) provide at least one first piece of information of the profile information from the user identification profile based on the user's specific permission to release the at least one first piece of information to the at least one third party; where the at least one first identification request comprises: i) at least one second timed unique alpha-numeric identifier, where the at least one second timed unique alpha-numeric identifier corresponds to the at least one first timed unique alpha-numeric identifier, and where the at least one second timed unique alpha-numeric identifier and the at least one first timed unique alpha-numeric identifier expire after a first pre-determined time period, and ii) a first timestamp related to the at least one first transaction; where the at least one first identification request has been generated in response to a receipt of the at least one second timed unique alpha-numeric identifier, at least one first visual presentation code of the at least one second timed unique alpha-numeric identifier, or both; matching, by the specifically programed identification management processing computer system, the at least one second timed unique alpha-numeric identifier to the user identification profile stored in the database of the central identification management system; based on the matching, transmitting, by the specifically programed identification management processing computer system, the at least one first piece of information of the profile information from the user identification profile; recording, by the specifically programed identification management processing computer system, in at least one permanent identification usage log, at least the following: i) the at least one first timed unique alpha-numeric identifier, the at least one first piece of information related to the user identification profile, or both, ii) at least one second piece of information related to the at least first transaction, and iii) the first timestamp related to the at least one first transaction; generating, by the specifically programed identification management processing computer system, at least one third timed unique alpha-numeric identifier, where the at least one third timed unique alpha-numeric identifier is associated with the user identification profile stored in the database of the central identification management system; and substituting, by the specifically programed identification management processing computer system, the at least one first timed unique alpha-numeric identifier with the at least one third timed unique alpha-numeric identifier after the first time period expires. In some embodiments, the at least one first timed unique alpha-numeric identifier and the at least one second timed unique alpha-numeric identifier are identical.

In some embodiments, the method further comprising: specifically programming, by the specifically programed identification management processing computer system, at least one electronic device of the user so that the at least one electronic device of the user is configured to: i) generate a second set of timed unique alpha-numeric identifiers, where the generating of the first set and the generating of the second set of timed unique alpha-numeric identifiers occur synchronously during a particular time period, and ii) display each timed unique alpha-numeric identifier and at least one respective visual presentation code associated with such timed unique alpha-numeric identifier; where the at least one second timed unique alpha-numeric identifier has been generated by the at least one electronic device of the user. In some embodiments, the personal identifying information comprise: i) a full name of the user, ii) at least one home address, and iii) at least one phone number.

In some embodiments, the financial identifying information comprise: i) at least one credit card information, and ii) at least one bank account information. In some embodiments, the personal security information comprise: i) at least one password, ii) at least one numerical passcode, iii) at least one response to at least one security question, and iv) at least one swipe pattern. In some embodiments, the personal identification trait information comprise: i) at least one fingerprint of the user, ii) an eye color, iii) an iris pattern, and iv) a height of the user. In some embodiments, the method further comprises: establishing, by the specifically programed identification management processing computer system, multi-level access rules for releasing the profile information in the user identification profile; where the at least one second timed unique alpha-numeric identifier comprises at least one level access identifier that corresponds to at least one level access rule of the multi-level access rules; and where the transmitting the at least one first piece of information of the profile information from the user identification profile is based on the at least one level access rule. In some embodiments, the at least one second timed unique alpha-numeric identifier comprises at least one lingering tag.

In some embodiments, the method further comprises: specifically programming, by the specifically programed identification management processing computer system, the at least one electronic device of the user so that the at least one electronic device of the user is configured to: i) display a confirmation tool to the user, ii) utilizing the confirmation tool, accept at least one fourth timed unique alpha-numeric identifier of the at least one third party, where the at least one third party uses the central identification management system, and iii) utilizing the confirmation tool, transmit the at least one fourth timed unique alpha-numeric identifier to the specifically programed identification management processing computer system; and receiving, via the confirmation tool, by the specifically programed identification management processing computer system, the at least one second timed unique alpha-numeric identifier and the at least one fourth timed unique alpha-numeric identifier, verifying, by the specifically programed identification management processing computer system, identities of the user and the at least one third party, by matching the at least one second timed unique alpha-numeric identifier and the at least one fourth timed unique alpha-numeric identifier with respective corresponding unique alpha-numeric identifier associated with the respective user identification profiles; generating, upon the verifying, by the specifically programed identification management processing computer system, at least one confirmation identifier associated with the user and the at least one third party; transmitting by the specifically programed identification management processing computer system, the at least one confirmation identifier; and recording, by the specifically programed identification management processing computer system, in the at least one permanent identification usage log, at least the following: i) the at least one second timed unique alpha-numeric identifier, ii) the at least one fourth timed unique alpha-numeric identifier, iii) the at least one confirmation identifier, and iv) a second timestamp related to the receiving, via the confirmation tool, the at least one second timed unique alpha-numeric identifier and the at least one fourth timed unique alpha-numeric identifier.

In some embodiments, the method further comprises: specifically programming, by the specifically programed identification management processing computer system, the at least one electronic device of the user so that the at least one electronic device of the user is configured to: i) display a business tool to the user, ii) utilizing the business tool, accept at least one fifth timed unique alpha-numeric identifier of the at least one third party, where the at least one third party uses the central identification management system, and iii) utilizing the business tool, transmit the at least one fifth timed unique alpha-numeric identifier to the specifically programed identification management processing computer system; and receiving, via the business tool, by the specifically programed identification management processing computer system, the at least one fifth timed unique alpha-numeric identifier, verifying, by the specifically programed identification management processing computer system, identity of at least one third party, by matching the at least one fifth timed unique alpha-numeric identifier with the respective user identification profile of the at least one third party; based on the verifying, transmitting, by the specifically programed identification management processing computer system, at least one second piece of information the respective user identification profile of the at least one third party; and recording, by the specifically programed identification management processing computer system, in the at least one permanent identification usage log, at least the following: i) the at least one fifth timed unique alpha-numeric identifier, ii) the at least one second, and iii) a third timestamp related to the receiving, via the business tool, the at least one fifth timed unique alpha-numeric identifier.

In some embodiments, the method further comprises: responding, by the specifically programed identification management processing computer system, to a electronic request for historical information regarding the at least one second timed unique alpha-numeric identifier based on the at least one permanent identification usage log. In some embodiments, the user is a business entity. In some embodiments, the at least one electronic device of the user is a portable electronic device. In some embodiments, the at least one first visual presentation code of the at least one second timed unique alpha-numeric identifier is at least one programmed QR code.

In some embodiments, the instant invention provides for a computer-implemented method that at least includes the following steps: receiving, by a specifically programed identification management processing computer system, a user registration request from a user who desires to establish a user identification profile; where the user registration request for the user identification profile at least includes at least a plurality of the following types of profile information of the user: i) personal identifying information, ii) personal security information, iii) personal identification trait information, iv) financial identifying information, v) governmental identifying information, vi) personal medical information, and vii) personal non-medical information; independently verifying, by the specifically programed identification management processing computer system, at least one of the following types of the profile information of the user: i) the personal identifying information, ii) the financial identifying information, and iii) the governmental identifying information; based on the independently verifying the user request for the user identification profile, registering, by the specifically programed identification management processing computer system, the user identification profile with a central identification management system; storing, by the specifically programed identification management processing computer system, the user identification profile in a database of the central identification management system; where the specifically programed identification management processing computer system is configured to generate a first set of timed unique alpha-numeric identifiers associated with the user identification profile stored in the database of the central identification management system; receiving, by the specifically programed identification management processing computer system, at least one first identification request; where the at least one first identification request at least requests the central identification management system to confirm an identity of the user; generating, by the specifically programed identification management processing computer system, at least one first timed unique alpha-numeric identifier of a first set of timed unique alpha-numeric identifiers, where the at least one first timed unique alpha-numeric identifier is associated with the user identification profile stored in the database of the central identification management system and where the at least one first timed unique alpha-numeric identifier expires after a first predetermined time period; recording, by the specifically programed identification management processing computer system, in at least one permanent identification usage log, at least the following: i) the at least one first timed unique alpha-numeric identifier, and ii) the first timestamp related to the at least one first identification request; transmitting, by the specifically programed identification management processing computer system, the at least one first timed unique alpha-numeric identifier in response to the at least one first identification request; and receiving, by the specifically programed identification management processing computer system, at least one tracking request for historical information associated with a use of the at least one first timed unique alpha-numeric identifier; and responding, by the specifically programed identification management processing computer system, to the at least one tracking request for historical information regarding the at least one first timed unique alpha-numeric identifier based on the at least one permanent identification usage log.

In some embodiments, the method can further include at least the following steps of: receiving, by the specifically programed identification management processing computer system, at least one first information request; where the at least one first information request is related to at least one first transaction to be engaged by the user with at least one third party; where the at least one first information request at least includes: i) the at least one first timed unique alpha-numeric identifier, and ii) a second timestamp related to at least one first transaction; where the at least one first information request at least requests the central identification management system to provide at least one first piece of information of the profile information from the user identification profile based on the user's specific permission to release the at least one first piece of information to the at least one third party; where the at least one first information request has been generated in response to a receipt of the at least one first timed unique alpha-numeric identifier, at least one first visual presentation code of the at least one first timed unique alpha-numeric identifier, or both; matching, by the specifically programed identification management processing computer system, the at least one first timed unique alpha-numeric identifier received with the at least one first information request to the at least one first timed unique alpha-numeric identifier associated with the user identification profile stored in the database of the central identification management system; based on the matching, transmitting, by the specifically programed identification management processing computer system, the at least one first piece of information of the profile information from the user identification profile; recording, by the specifically programed identification management processing computer system, in at least one permanent identification usage log, at least the following: i) the at least one first timed unique alpha-numeric identifier, the at least one first piece of information related to the user identification profile, or both, ii) at least one second piece of information related to the at least first transaction, and iii) the second timestamp related to the at least one first transaction; and deactivating, by the specifically programed identification management processing computer system, the at least one first timed unique alpha-numeric identifier after the first pre-determined time period has expired.

In some embodiments, the method can further include at least the following steps of: specifically programming, by the specifically programed identification management processing computer system, at least one electronic device of the user so that the at least one electronic device of the user is configured to: i) originate identification requests, and ii) display each timed unique alpha-numeric identifier and at least one respective visual presentation code associated with such timed unique alpha-numeric identifier.

In some embodiments, the personal identifying information at least includes: i) a full name of the user, ii) at least one home address, and iii) at least one phone number. In some embodiments, the financial identifying information at least includes: i) at least one credit card information, and ii) at least one bank account information. In some embodiments, the personal security information at least includes: i) at least one password, ii) at least one numerical passcode, iii) at least one response to at least one security question, and iv) at least one swipe pattern. In some embodiments, the personal identification trait information at least includes: i) at least one fingerprint of the user, ii) an eye color, iii) an iris pattern, and iv) a height of the user.

In some embodiments, the method can further include at least the following steps of: establishing, by the specifically programed identification management processing computer system, access rules for releasing the profile information in the user identification profile based on at least one grouping of the profile information; and where the at least one first information request further at least includes an indication that the user has specifically authorized to release the profile information corresponding to the at least one grouping.

In some embodiments, the user is a business entity. In some embodiments, the at least one electronic device of the user is a portable electronic device. In some embodiments, the at least one first visual presentation code of the at least one first timed unique alpha-numeric identifier is at least one programmed QR code.

In some embodiments, the instant invention provides for a central identification management computer system that includes at least the following components: at least one programmed computer, having a non-transient computer tangible readable medium having stored thereon software instructions executable by at least one processor of the computer, where the software instructions at least include: code to receive a user registration request from a user who desires to establish a user identification profile; where the user registration request for the user identification profile at least includes at least a plurality of the following types of profile information of the user: i) personal identifying information, ii) personal security information, iii) personal identification trait information, iv) financial identifying information, v) governmental identifying information, vi) personal medical information, and vii) personal non-medical information; code to independently verify at least one of the following types of the profile information of the user: i) the personal identifying information, ii) the financial identifying information, and iii) the governmental identifying information; code to, based on the independently verifying the user request for the user identification profile, register the user identification profile with the central identification management computer system; code to store the user identification profile in a database of the central identification management computer system; where the code is configured to generate a first set of timed unique alpha-numeric identifiers associated with the user identification profile stored in the database of the central identification management computer system; code to receive at least one first identification request; where the at least one first identification request at least requests the central identification management computer system to confirm an identity of the user; code to generate at least one first timed unique alpha-numeric identifier of a first set of timed unique alpha-numeric identifiers, where the at least one first timed unique alpha-numeric identifier is associated with the user identification profile stored in the database of the central identification management system and where the at least one first timed unique alpha-numeric identifier expires after a first pre-determined time period; code to record, in at least one permanent identification usage log, at least the following: i) the at least one first timed unique alpha-numeric identifier, and ii) the first timestamp related to the at least one first identification request; code to transmit the at least one first timed unique alpha-numeric identifier in response to the at least one first identification request; and code to receive at least one tracking request for historical information associated with a use of the at least one first timed unique alpha-numeric identifier; and code to respond to the at least one tracking request for historical information regarding the at least one first timed unique alpha-numeric identifier based on the at least one permanent identification usage log.

While a number of embodiments of the present invention have been described, it is understood that these embodiments are illustrative only, and not restrictive, and that many modifications may become apparent to those of ordinary skill in the art.

What is claimed is:

1. A computer-implemented method, comprising:
receiving, by a specifically programed identification management processing computer system, a user registration request from a mobile device of a user who desires to establish a user identification profile;
independently verifying, by the specifically programed identification management processing computer system, the profile information of the user:
based on the independently verifying the user request for the user identification profile, registering, by the specifically programed identification management processing computer system, the user identification profile with a central identification management system;
storing, by the specifically programed identification management processing computer system, the user identification profile in a database of the central identification management system;
receiving, by the specifically programed identification management processing computer system, at least one first identification request;
wherein the at least one first identification request at least requests the central identification management system to confirm an identity of the user;
generating, by the specifically programed identification management processing computer system, at least one first timed unique alpha-numeric identifier;
recording, by the specifically programed identification management processing computer system, the at least one first timed unique alpha-numeric identifier; and
transmitting, by the specifically programed identification management processing computer system, the at least one first timed unique alpha-numeric identifier in response to the at least one first identification request.

* * * * *